United States Patent
Morita et al.

[11] Patent Number: 6,037,738
[45] Date of Patent: Mar. 14, 2000

[54] SERVO CONTROL METHOD AND SERVO CONTROL SYSTEM

[75] Inventors: Chihiro Morita; Misako Okada; Nobuyasu Takaki, all of Nagoya, Japan

[73] Assignee: Mitsubishi Denki Kabushiki Kaisha, Tokyo, Japan

[21] Appl. No.: 09/047,324

[22] Filed: Mar. 25, 1998

[30] Foreign Application Priority Data

Mar. 25, 1997 [JP] Japan .................................. 9-072443
Mar. 17, 1998 [JP] Japan ................................ 10-066428

[51] Int. Cl.⁷ .................................................. G05B 11/32
[52] U.S. Cl. ........................................... 318/625; 318/560
[58] Field of Search .................................. 318/562, 569, 318/625, 580, 574, 572, 101, 563, 476, 595, 41, 560

[56] References Cited

U.S. PATENT DOCUMENTS

| | | | |
|---|---|---|---|
| 4,456,963 | 6/1984 | Matusek | 318/572 |
| 4,847,779 | 7/1989 | Masao et al. | 318/476 |
| 4,902,948 | 2/1990 | Sherman et al. | 318/580 |
| 4,931,712 | 6/1990 | DiGiulio et al. | 318/625 |
| 4,970,449 | 11/1990 | Kawamura et al. | 318/569 |
| 5,121,040 | 6/1992 | Takizawa et al. | 318/574 |
| 5,274,311 | 12/1993 | Littlejohn et al. | 318/562 |
| 5,488,274 | 1/1996 | Satoh | 318/101 |
| 5,689,161 | 11/1997 | Fugere et al. | 318/563 |

FOREIGN PATENT DOCUMENTS

| | | |
|---|---|---|
| 1-195509 | 8/1989 | Japan . |
| 3-245204 | 10/1991 | Japan . |
| 3-110519 | 11/1991 | Japan . |

*Primary Examiner*—Bentsu Ro
*Assistant Examiner*—Rita Leykin
*Attorney, Agent, or Firm*—Sughrue, Mion, Zinn Macpeak & Seas, PLLC

[57] ABSTRACT

A servo control method is realized by connecting a high-speed serial communication interface with a microcomputer, a dual port memory and an IC for high-speed serial communication mounted thereon to an extended bus of a personal computer and by connecting between the high-speed serial communication interface and a plurality of servo controllers with a serial line in a multi-drop system.

17 Claims, 19 Drawing Sheets

FIG.9
REQUEST AREA FOR
MULTI-PURPOSE PROCESSING
35 OR 54
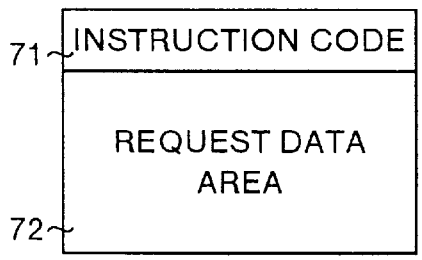
RESPONSE AREA FOR
MULTI-PURPOSE PROCESSING
45 OR 57
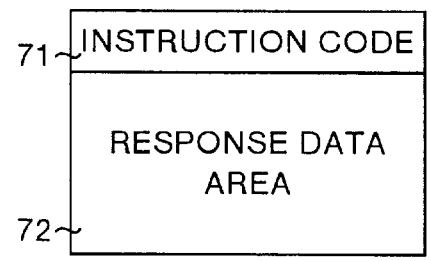

FIG.14

REQUEST AREA FOR
MULTI-PURPOSE PROCESSING
WHEN RECOGNIZING REMAINING SIZE
OF DIRECT INSTRUCTION BUFFER

RESPONSE AREA FOR
MULTI-PURPOSE PROCESSING
WHEN RECOGNIZING REMAINING SIZE
OF DIRECT INSTRUCTION BUFFER

35 OR 54

45 OR 57

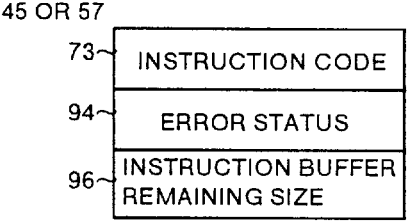

FIG.15

REQUEST AREA FOR
MULTI-PURPOSE PROCESSING
AT CONTROL PROGRAM
DIRECT INSTRUCTION

RESPONSE AREA FOR
MULTI-PURPOSE PROCESSING
AT CONTROL PROGRAM
DIRECT INSTRUCTION

35 OR 54

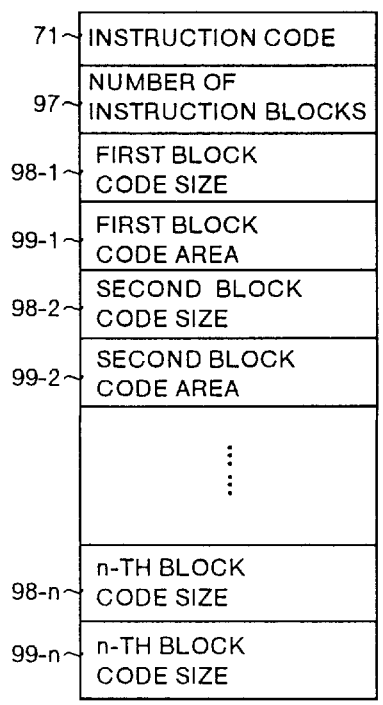

45 OR 57

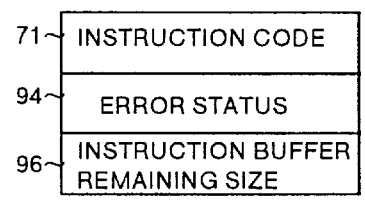

6,037,738

SERVO CONTROL METHOD AND SERVO CONTROL SYSTEM

FIELD OF THE INVENTION

The present invention relates to a servo control method and a servo control system with a computer such as a personal computer and a plurality of servo controllers connected to each other.

BACKGROUND OF THE INVENTION

In a conventional type of servo control system having a host computer and a plurality of servo controllers connected to the host computer, the host computer and each of the servo controllers are connected to each other through a serial communication line such as RS-232C so that data transaction is executed asynchronously to each other.

FIG. 24 is a block diagram showing a NC system disclosed in Japanese Patent Laid Open Publication No. HEI 1-195509. A plurality of NC units are connected to a unit of host computer through RS-232C in this NC system as shown in the figure. In this example of the NC system, the host computer 163 has a plurality of RS-232C interfaces, and interface conversion boards are connected to the plurality of RS-232C interfaces respectively. Each of the interface conversion boards is connected to each of the NC units through a tape reader interface DLM, and a plurality of NC units are connected to the host computer 163 through the plurality of interface conversion boards 160-1 to 160-n.

Further connected to this host computer 163 is an NC unit with a remote buffer through another RS-232C interface.

This NC system is possible to execute processing, from the host computer 163 to NC units 170-1 to 170-n, such as setting or changing of parameters, write/read of a control program, and intermittent monitoring of internal data in the NC units 170-1 to 170-n.

In the servo system with the host computer and servo controllers connected to each other through serial communication lines such as RS-232C each for executing data transaction asynchronous to each other, a communication speed was slow and communications were executed in asynchronism to a control cycle of each of the servo controllers, so that, assuming a case as an example where internal data in any of the servo controllers was monitored from the host computer, dynamic changes in the internal data in the servo controller could not be monitored with high precision because monitoring could be executed only in a comparatively longer cycle as compared to the control cycle for the servo controller and also a sampling time was not accurately specified.

For this reason, a speed and a current value or the like of a servo motor had to be monitored by using a large-sized and expensive measuring device such as a digital storage oscilloscope for adjustment required at the time of getting the servo system up and running or the like Also, the above circumstances required works near a high voltage and a large current circuit such as a distribution panel, which has raised concerns for safety.

If processing, like transfer of a large scale file, requiring occupation of a communication line for a long period of time is executed, processing such as monitoring can not be executed during this period of time.

When a case such as welding of various works each having a complicated form or coating thereof needs a large amount of point data and also needs to rewrite a machining program quite often, point data and a machining program are frequently transferred from the host computer to the servo controllers, and for this reason some troubles occur in monitoring of a current position or the like of the servo motor by the host computer or in transmission of an instruction for start from the host computer to the servo controllers.

When any unit with comparatively large fluctuation in load is to be controlled, there is employed a method of correcting an instruction itself so that target movement coincides with actual movement. When this method is employed in a line for conveyor such as a belt conveyor device in which changes in load are comparatively frequent and for which a plurality of servo controllers are used, high-capacity memories each with software for realizing the function stored therein for execution have to be provided in the servo controllers respectively. In addition, if this method is employed, a load to the CPU increases, and for this reason, functions to be executed originally by the servo controller such as processing for selecting and using any of a plurality of algorithms corresponding to each object to be controlled or processing for replacing algorithms with each other are prevented.

When data is to be written from the host computer to the plurality of servo controllers, processing for writing data to each of the servo controllers by matching control cycles of the servo controllers to each other respectively and synchronizing among the servo controllers can not be executed.

There has been provided, in the conventional type of system, an application program operating on a general-purpose OS such as MS-DOS® or Windows® from vendors of servo controllers so that users can set and change parameters in the servo controller for the system or write and read a control program to and from the servo controllers, but it is difficult to prepare and supply an application program so as to enable construction of a man-machine interface matched to an actual device (e.g., various types of man-machine interface each matched to a user's system in which a picture simulating an actual device such as a line for conveyor is displayed on a screen of the host computer and monitor sections such as switches are displayed in the picture respectively) because access to an internal memory of any of the servo controllers according to an instruction from the host computer is not easily and quickly performed, which causes inconvenience in operability for a user.

When a large amount of point data to be set and a machining program to be rewritten frequently cause a communication line between the host computer and the servo controllers to be occupied, processing such as monitoring can not be executed with quick response. For example, when the host computer always monitors a status of each servo controller and needs to execute appropriate recovery processing when an error occurs, this recovery processing is not executed quickly, which is disadvantageous.

It is also hard to operate a plurality of servo controllers synchronously to each other.

Although there has been employed a method of electrically synchronizing steps to each other by controlling a large number of servo motors by one unit of servo controller, this method has some problems in the point that a longer cable is required as the number of axes to be controlled increases, and in addition, it is difficult to divide a program for each step for management due to increase of load on the servo controller, and it is also difficult to prepare the program.

A machine such as a large-sized printing machine for machining in a plurality of steps while paper wound into a roll is fed out requires synchronization between a timing for feeding out the paper and a machining operation in each step, so that, in the conventional type of system, synchronization is realized by using a main shaft which is a reference as a driving source and also using cams and gears or the like rotatably driven by this main shaft, but this method requires a large-sized and expensive device, and also requires maintenance of the machining device.

The conventional type of system disadvantageously requires particular software on the host computer for the purpose that the host computer sets and changes parameters in the servo controllers or writes and reads a control program.

When any servo controller is to write data in other servo controller or the servo controller is to read out data from other servo controller, data transaction is conventionally executed therebetween through a programmable controller, but a sequential program for realizing the operation should be prepared by a user, which may need a long time for preparing the program.

SUMMARY OF THE INVENTION

It is an object of the present invention that each of a plurality of servo controllers can concurrently execute a specified number of processing.

It is another object of the present invention that correction of instruction data to a servo controller according to internal data in the servo controller can easily be performed.

It is another object of the present invention that writing of data on an internal memory of a servo controller according to an instruction from the computer can easily be performed.

It is another object of the present invention that recovery processing can quickly be executed when any error occurs in servo controllers.

It is another object of the present invention that writing of a control program in servo controllers can easily be performed.

It is another object of the present invention that control for synchronism between motors connected to a plurality of servo controllers respectively can easily be performed.

It is another object of the present invention that read/write of internal parameters and a control program or the like from/to servo controllers can easily be performed from a computer.

It is another object of the present invention that access to a memory in a servo controller can be restricted according to setting of file attributes.

It is another object of the present invention that a current processing status or the like in the servo controller can easily be notified to other servo controllers or internal data in other servo controllers can easily be changed from the servo controller.

The present invention provides a servo control method for executing serial communications between a computer and a plurality of servo controllers each for providing controls over motion of a motor, and the method comprises a step in which first transfer information consisting of a specified number of information such as request information for each of the plurality of servo controllers is transferred synchronously to a specified master clock from the computer to the servo controllers, and a step in which second transfer information consisting of a specified number of information such as response information is transferred synchronously to the master clock from the servo controllers to the computer; and the servo controllers concurrently execute a specified number of processing according to the first transfer information in synchronism to the master clock and the motion control by the servo controllers is concurrently executed synchronously to the master clock.

In the present invention, instructional information corrected by using internal information in the servo controller such as feedback data sent from the servo controller as information in response information for the second transfer information is prepared, and this corrected instructional information is sent as information in request information for the first transfer information to the servo controllers.

The present invention provides a servo control method, in which areas corresponding to storage areas for internal information on memories of a plurality of servo controllers are previously allocated in a computer memory and internal information in the plurality of servo controllers are periodically sent as information in response information for the second transfer information to the computer and written on a memory of the computer, and the method comprises a step in which contents in any area on the memory of the computer is rewritten by any of a plurality of applications or the like, and a step in which the information rewritten in the area is sent as information in request information for the first transfer information to the plurality of servo controllers and contents in an area allocated in the memory of the servo controller corresponding to the area is rewritten with the information above.

The present invention provides a servo control method comprising a step in which alarm information generated in any of the servo controllers is sent to the computer as information in response information for the second transfer information and is written on a memory of the computer, and appropriate instructional information corresponding to the alarm information is sent as information in request information for the second transfer information to the servo controller.

The present invention provides a servo control method further comprising a step of transmitting a program for control as information in request information for the first transfer information from the computer to the servo controller.

The present invention provides a servo control method further comprising a step of sending instructional information for execution of a control program for each of the servo controllers as information in request information for the first transfer information from the computer to the plurality of servo controllers for controlling synchronicity between motors connected to the plurality of servo controllers respectively.

The present invention provides a servo control method further comprising a step of accessing internal information as a file in the servo controllers by sending write data or the like as information in request information for the first transfer information from the computer to the servo controllers and also sending read data as information in response information for the second transfer information from the servo controllers to the computer.

In the present invention, access to a memory in a servo controller is restricted according to setting of file attributes.

The present invention provides a servo control method in which areas corresponding to storage areas for internal information in memories of a plurality of servo controllers are previously allocated in a computer memory and internal information stored in the storage areas are periodically sent as information in response information for the second transfer information to the computer and written on a memory of the computer, and the servo control method comprises a step of setting any of internal information in the servo controllers as particular information; a step in which any of the plurality of servo controllers rewrites internal information in the servo controller corresponding to the internal information set in this particular information; and a step in which this rewritten and updated internal information is sent as information in response information for the second transfer information to the computer, the computer sends the updated internal information as information in request information for the first transfer information to each of the other servo controllers respectively and corresponding internal information in each of the servo controllers is rewritten with this updated internal information.

The present invention provides a servo control system having a computer and a plurality of servo controllers for controlling motion of motors to execute serial communication between the plurality of servo controllers and the computer, and in the servo control system, first transfer information consisting of a specified number of information such as request information for each of the plurality of servo controllers is sent synchronously to a specified master clock from the computer to the servo controllers; second transfer information consisting of a specified number of information such as response information is sent synchronously to the master clock from the servo controllers to the computer; the servo controllers concurrently execute a specified number of processing according to the first transfer information synchronously to the master clock; and the motion control by the servo controllers is concurrently executed synchronously to the master clock.

Other objects and features of this invention will become understood from the following description with reference to the accompanying drawings.

BRIEF DESCRIPTION OF THE DRAWINGS

FIG. 9 is views showing structures of a request area as well as a response area for multi-purpose processing in Embodiment 1 of the present invention;

FIG. 14 is views showing structures of a request area as well as a response area for multi-purpose processing used for recognition of a direct instruction buffer remaining size in Embodiment 1 of the present invention;

FIG. 15 is views showing structures of a request area as well as a response area for multi-purpose processing used for a control program direct instruction in Embodiment 1 of the present invention;

DESCRIPTION OF THE PREFERRED EMBODIMENTS

Figure 1:
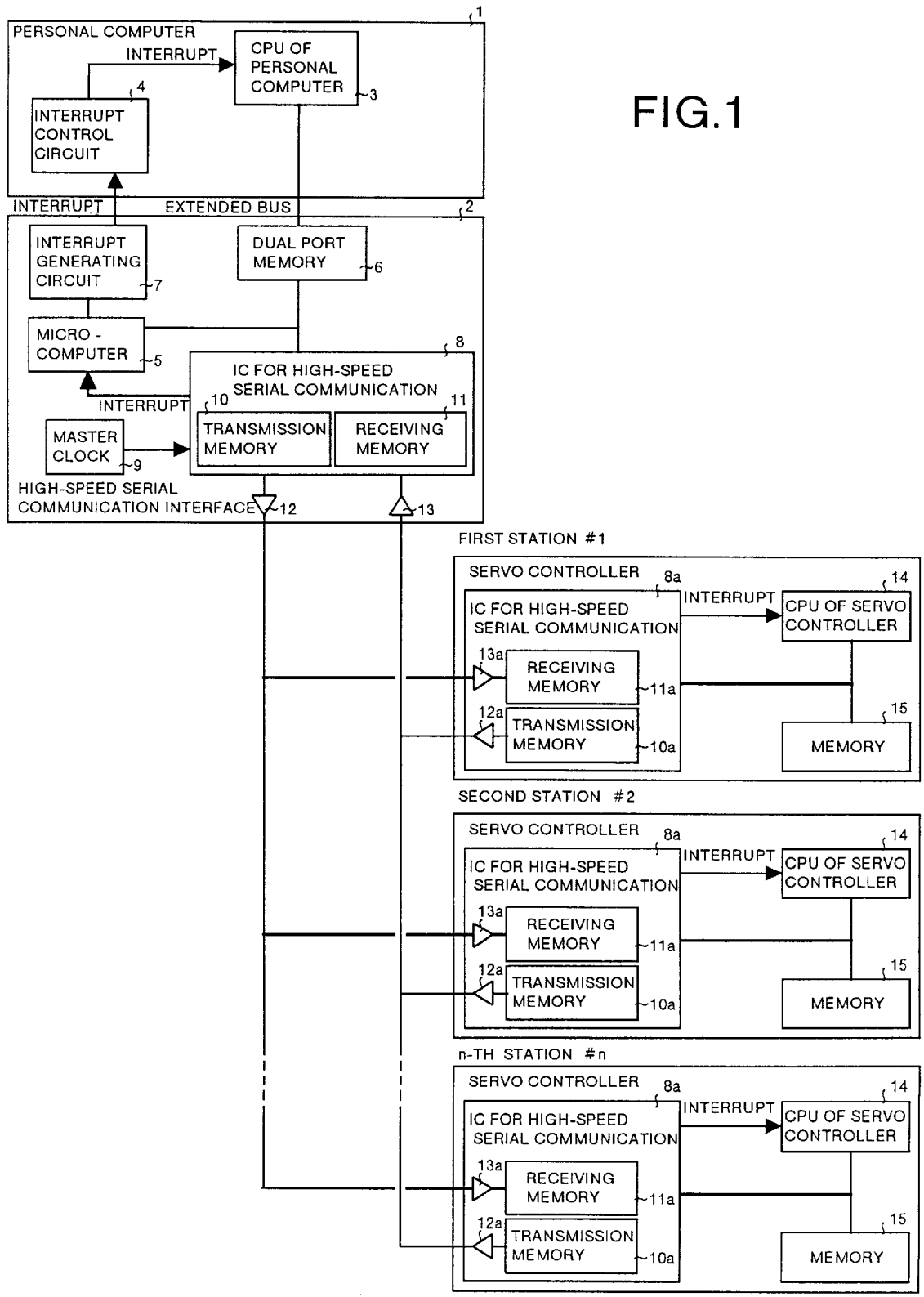
FIG. 1 is a block diagram showing a servo control system as a whole in Embodiment 1 of the present invention.

FIG. 1 is a block diagram showing a servo control system according to one embodiment of the present invention. In the figure, designated at the reference numeral 1 is a personal computer (PC), at #1 to #n a servo controller respectively, and at 2 a high-speed serial communication interface. The high-speed serial communication interface 2 is provided in the PC 1 and executes communication processing for performing serial data transfer between the PC 1 and the servo controllers #1 to #n.

Mounted on the PC 1 are a CPU 3 and an interrupt control circuit 4 for receiving an interrupt request from the high-speed serial communication interface 2 and notifying the interrupt to the CPU 3.

Mounted on the high-speed serial communication interface 2 are a microcomputer 5, a dual port memory 6, an interrupt generating circuit 7, an IC 8 for high-speed serial communication, a master clock 9, a line driver 12, and a line receiver 13.

The dual port memory 6 can be accessed from both of the microcomputer 5 and the CPU 3 for the PC 1. The interrupt generating circuit 7 generates an interrupt signal according to an instruction from the microcomputer 5, and sends the signal to the interrupt control circuit 4 for the PC 1. The IC 8 for high-speed serial communication incorporates therein a transmission memory 10 as well as a receiving memory 11, converts transmission data from parallel to serial, sends the data to a transmission line as first transfer information, for example as information in a data frame at the time of transmission, receives second transfer information from the transmission line, for example, reception data sent as information in the data frame at the time of reception, and converts the data from serial to parallel. The master clock 9 generates a master clock as a reference for a transmission rate and sends the clock to the IC 8 for high-speed serial communication.

Mounted on each of the servo controllers #1 to #n are the IC 8 for high-speed serial communication, a transmission line driver 12a, a receiving line receiver 13a, a CPU 14, and a memory 15 respectively, and a unit or a plurality of servo motor drivers (not shown) are connected to the servo controller.

As shown in FIG. 1, the high-speed serial communication interface 2 is connected to an extended bus for the PC 1, and n-units of servo controller (servo controllers #1 to #n) are connected to this high-speed serial communication interface 2 in the multi-drop system.

Namely, output from the transmission line driver 12 for the high-speed serial communication interface 2 is inputted into the receiving line receiver 13a provided in each of the servo controllers #1 to #n respectively through a cable, and output from each of the transmission line driver 12a provided in each of the servo controllers #1 to #n respectively is inputted into the receiving line receiver 13 for the high-speed serial communication interface 2 through a cable.

Figure 2:
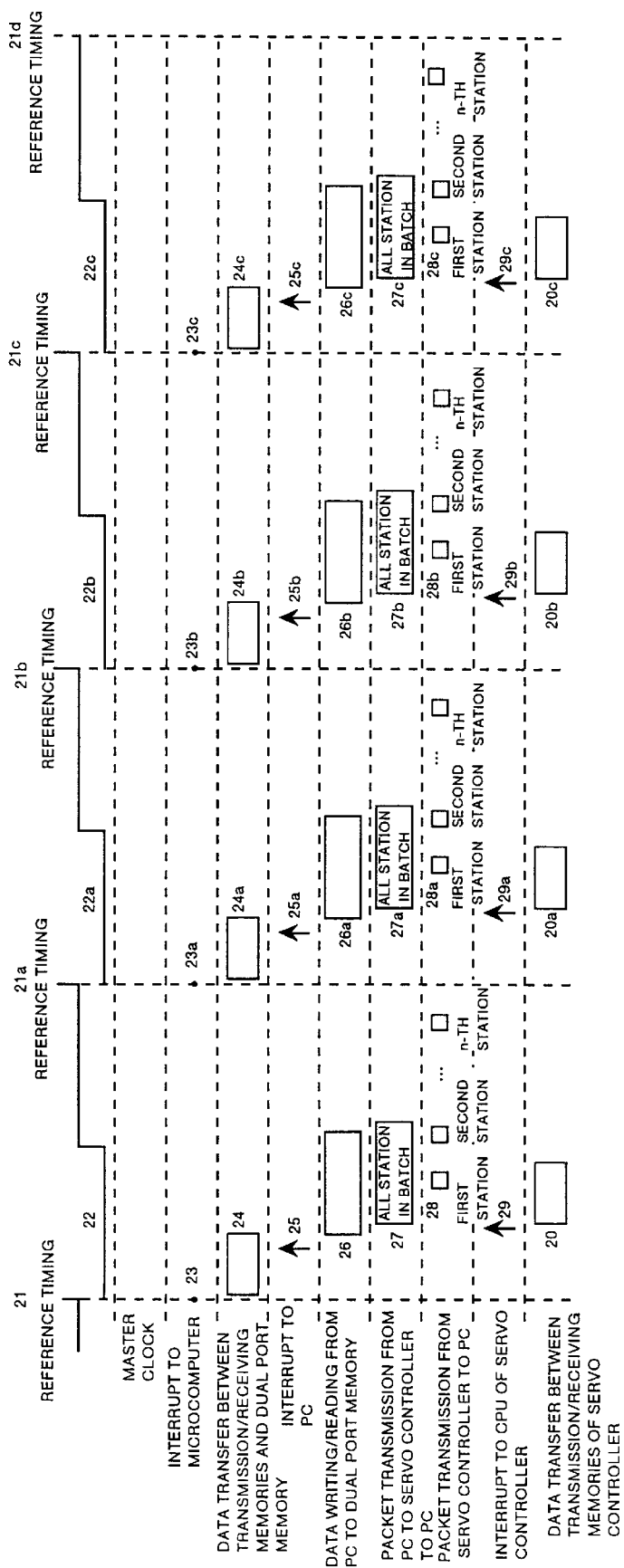
FIG. 2 is a timing chart showing communication timings in Embodiment 1 of the present invention.

FIG. 2 is a timing chart showing operations of the servo system shown in FIG. 1. At first, brief description is made for operations in an initial control cycle (referring to the control cycle as a master clock cycle hereinafter) shown in FIG. 2.

The IC 8 for high-speed serial communication sends an interrupt signal to the microcomputer 5 (23 in FIG. 2) in the high-speed serial communication interface 2 at a falling edge of the master clock [at a reference timing (21 in FIG. 2)].

According to this interrupt signal, the high-speed serial communication interface 2 performs operations (I) to (III) as described below.

(I) Data received by the receiving memory 11 is written in a receiving area on the dual port memory 6 (24 in FIG. 2).

(II) Transmission data stored in a transmission area on the dual port memory 6 is transferred to the transmission memory 10 (24 in FIG. 2).

It should be noted that contents stored in the transmission area on the dual port memory 6 is transmission data having previously been written therein by the CPU 3 for the PC 1.

(III) After the operations (I) and (II), the microcomputer 5 sends an interrupt signal to the interrupt control circuit 4 for the PC 1 through the interrupt generating circuit 7 (25 in FIG. 2).

When the interrupt control circuit 4 for the PC 1 receives this interrupt signal, the PC 1 writes transmission data to be transferred to a servo controller in the next master clock cycle in the transmission area on the dual port memory 6, and reads out contents from the receiving area on the dual port memory 6 (26 in FIG. 2).

Further, when a prespecified period of time has passed, the transmission data stored on the transmission memory 10 in the IC 8 for high-speed serial communication is converted from parallel to serial, and the converted data is transferred as a transmission packet to each of the servo controllers #1 to #n respectively through the transmission line driver 12 (27 in FIG. 2).

In each of the servo controllers #1 to #n, the IC 8a for high-speed serial communication thereof sends, when having received this transmission packet, an interrupt signal to the CPU 14 at a header timing of the packet (29 in FIG. 2).

According to this interrupt signal, the CPU 14 transfers contents of a receiving memory 11a to each memory 15 and starts an operation to transfer the transmission data having previously been stored on the memory 15 to a transmission memory 10a (20 in FIG. 2).

Further, when a prespecified period of time has passed, in each of the servo controllers #1 to #n, transmission data stored on the transmission memory 10a is transmitted to the PC 1 through the transmission line driver 12a (28 in FIG. 2).

At the time of transmission, each of the servo controllers #1 to #n transmits, at a timing displaced from other timing by each station, transmission data so that transmission data sent from each station does not collide against each other.

As described above, the transmission data is sent from the servo controllers #1 to #n to the PC 1 at the header timing of the received packet (29 in FIG. 2) as a reference having been sent from the PC 1 to the servo controllers #1 to #n, and for this reason, packet transaction between the PC 1 and the servo controllers #1 to #n is executed in synchronism between the servo controllers.

Figure 3:
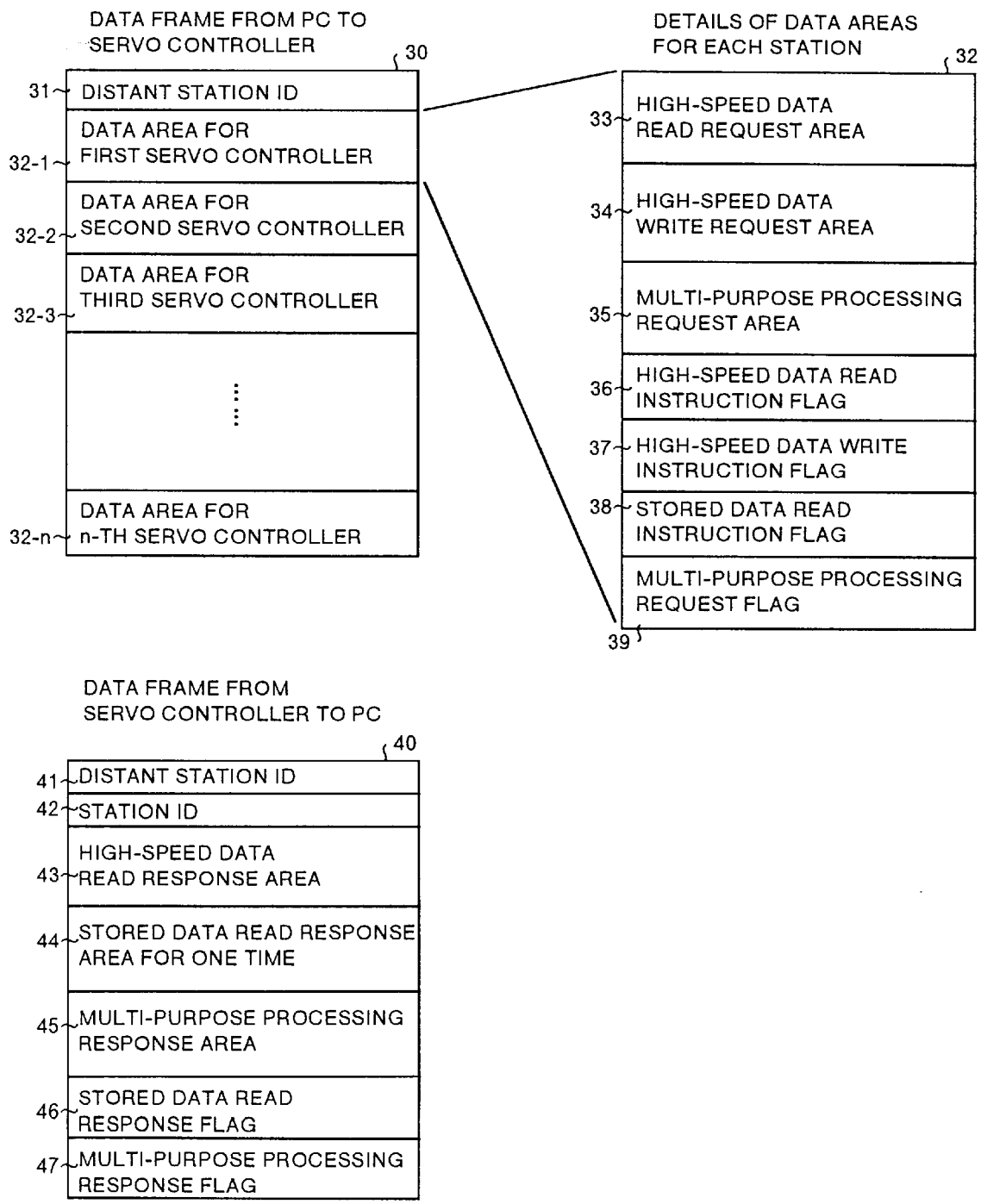
FIG. 3 is views showing structures of data frames received and transmitted between a high-speed serial communication interface and a servo controller in Embodiment 1 of the present invention.

FIG. 3 is views showing structures of a data frame in a transmission packet sent from the PC 1 to the servo controllers #1 to #n as well as of a data frame in a received packet sent from the servo controllers #1 to #n to the PC 1.

It should be noted that data having the same contents as those of the data frame for transmission is temporarily stored also on the transmission memory 10 of the high-speed serial communication interface 2 as well as on the receiving memory 11a of each of the servo controllers. Also data having the same contents as those of the received data frame is also temporarily stored on the receiving memory 11 of the high-speed serial communication interface 2 as well as on the transmission memory 10a of each of the servo controllers.

In FIG. 3, the reference numeral 30 indicates a structure of a transmission data frame to be sent from the PC 1 to the servo controllers #1 to #n.

In the data frame 30, the reference numeral 31 indicates an area where a communicating station ID (abbreviation for identification) is stored. The IC 18a for high-speed serial communication in each of the servo controllers #1 to #n compares the communicating station ID stored in this area 31 to ID of the station, fetches the data frame 30 if both of the IDs coincide with each other, and stores the frame on the receiving memory 11a.

The data frame 30 has areas 32-1 to 32-n corresponding to the servo controllers #1 to #n respectively in a space following the area 31.

When information indicating "all station in batch" as a communicating station ID is stored in the area 31, all the servo controllers #1 to #n fetch once contents of the data frame 30 in the receiving memories 11a of the stations respectively, and transfer only the contents in the data area corresponding to each of the stations among the data areas 32-1 to 32-n to each memory 15 of the stations.

In FIG. 3, the reference numeral 32 indicates a detailed structure of data stored in each of the areas 32-1 to 32-n. In the detailed structure 32 of data, the reference numeral 33 indicates an area for storing therein "high-speed data read request". Stored in this area are, as the "high-speed data read request", an address and a key word or the like indicating a place to be read out on the memory 15.

The reference numeral 34 indicates an area for storing therein "high-speed data write request". Stored in this area is, as the "high-speed data write request", an address, a key word, data to be written or the like which are to be written on the memory 15.

The reference numeral 35 indicates an area for storing therein "multi-purpose processing request" where instruction code and modes or the like shown in FIG. 12 to FIG. 15 are stored.

It should be noted that each of the "high-speed data read request", "high-speed data write request" and "multi-purpose processing request" is request information corresponding to contents of each processing respectively.

In the figure, designated at the reference numeral 36 is an area for storing therein a high-speed data read instruction flag, at 37 an area for storing therein a high-speed data write instruction flag, at 38 an area for storing therein a stored data read instruction flag, and at 38 an area for storing therein a multi-purpose processing request flag.

Next description is made for a data frame at the time of reception thereof sent from the servo controllers #1 to #n to the PC 1. In FIG. 3, the reference numeral 40 indicates a data frame at the time of reception thereof. The reference numeral 41 in the data frame 40 indicates an area for storing therein a communicating station ID. Written in this area is, as a communicating station ID, code indicating the high-speed serial communication interface 2.

The IC 8 for high-speed serial communication in the high-speed serial communication interface 2 recognizes that the data frame 40 should be fetched in the station according to this communicating station ID, and stores the contents of the data frame 40 on the receiving memory 11.

The reference numeral 42 in the data frame 40 indicates an area for storing therein the station ID indicating the servo controller in the transmission side.

The high-speed serial communication interface 2 can recognize from which servo controller each of the plurality of received data frames 40 has been sent according to the contents of this area 42 even after the contents of the plurality of data frames 40 are stored on the receiving memory 11 in the order of reception thereof.

The reference numeral 43 indicates an area for storing therein "high-speed data read response". Stored in this area is, as the "high-speed data read response", contents read out from the memory 15.

The reference numeral 44 indicates an area for storing therein "high-speed data write response". Stored in this area are, as the "high-speed data write response", instruction code and error status or the like.

The reference numeral 45 indicates an area for storing therein "multi-purpose processing response" in which data such as instruction code, error status and an instruction buffer remaining size shown in FIG. 12 to FIG. 15 are stored.

It should be noted that each of the "high-speed data read response", "high-speed data write response" and "multi-purpose processing response" is response information corresponding to contents of each processing respectively.

In the figure, designated at the reference numeral 46 is an area for storing therein a stored data read response flag, and at 47 an area for storing therein a multi-purpose processing response flag.

Figure 4:
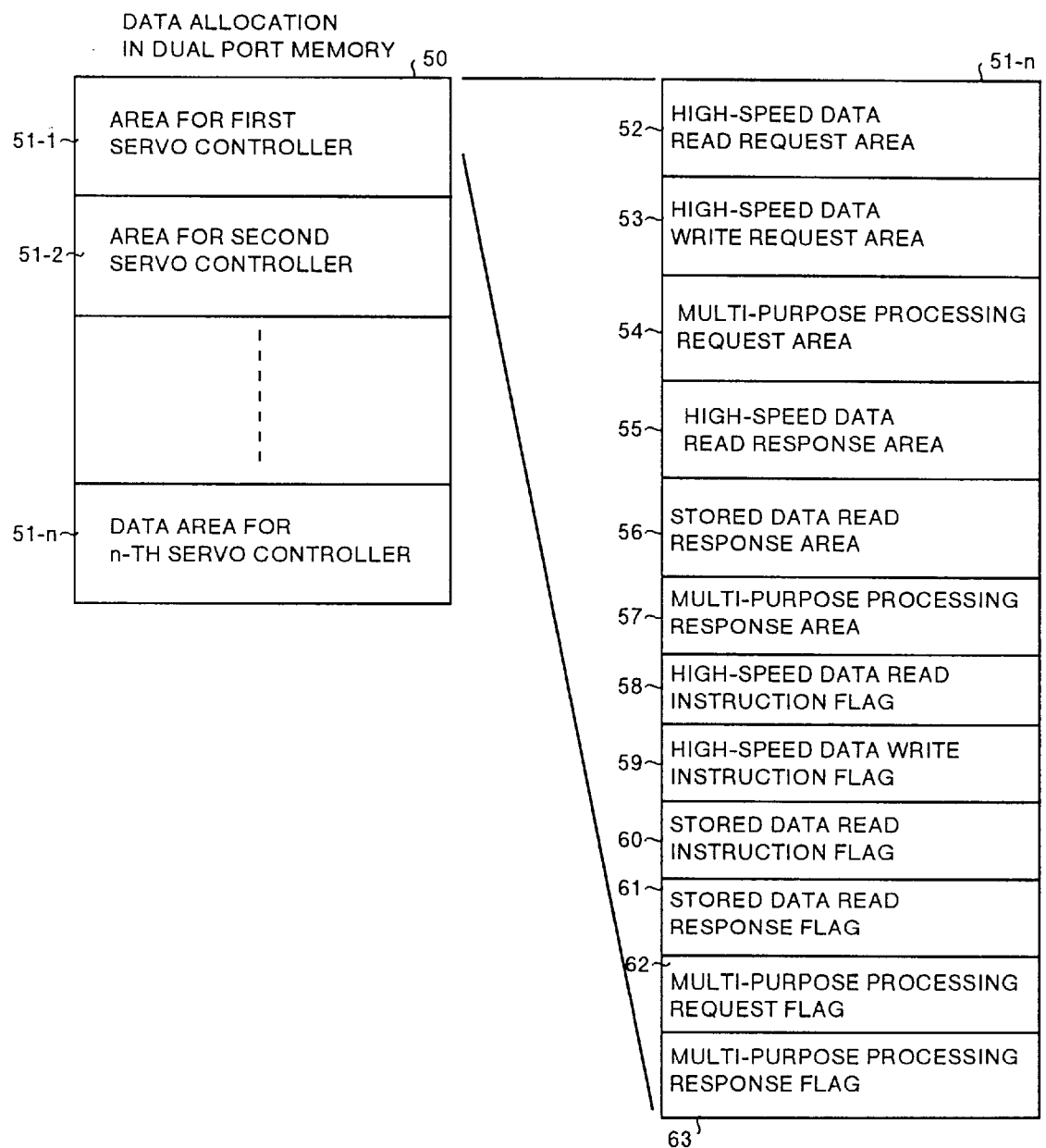
FIG. 4 is a view showing a structure of data on a dual port memory in Embodiment 1 of the present invention.

FIG. 4 is a view showing a memory structure of the dual port memory 6. As shown in the figure, areas 51-1 to 51-n are provided on the dual port memory 6 in correspondence with the servo controllers #1 to #n respectively.

In FIG. 4, the reference numeral 51-n in the right side thereof indicates a detailed structure of each of the areas (areas 51-1 to 51-n) for data to be sent to each station in the left side on the figure.

In the 51-n in the right side, designated at the reference numeral 52 is an area for storing therein "high-speed data read request", at 53 an area for storing therein "high-speed data write request", at 54 an area for storing therein "multi-purpose processing request", at 55 an area for storing therein "high-speed data read response", at 56 an area for storing therein "stored data read response", at 57 an area for storing therein "multi-purpose processing response", at 58 an area for storing therein a high-speed data read instruction flag, at 59 an area for storing therein a high-speed data write instruction flag, at 60 an area for storing therein a stored data read instruction flag, at 61 an area for storing therein a stored data read response flag, at 62 an area for storing therein a multi-purpose processing request flag, and at 63 an area for storing therein a multi-purpose processing response flag.

Next detailed description is made for "high-speed data read function" for rapidly reading out data from the servo controllers #1 to #n in synchronism to the master clock.

At first, the PC 1 sets particular specifying information sent from the servo controllers #1 to #n in the area 52 on the dual port memory 6 (26 in FIG. 2). This specifying information is used for specifying data to be read out comprising an ID number and a key word.

When the "high-speed data read instruction flag" stored in the area 58 is ON, in the next master clock cycle (second master clock cycle in FIG. 2), the microcomputer 5 sets "high-speed data read request" in the area 33 on the transmission memory 10 in the high-speed serial communication interface 2, and turns ON the "high-speed data read instruction flag" stored in the area 36 on the transmission memory 10 (24a in FIG. 2).

The data frame with those "high-speed data read request" and "high-speed data read instruction flag" mounted thereon is transmitted to the servo controllers #1 to #n (27a in FIG. 2).

In the next master clock cycle (third master clock cycle in FIG. 2), each of the servo controllers #1 to #n fetches the "high-speed data read request" from the area 33 in the data area for the station of the data frame, stores the data on the receiving memory 11a, and writes the contents read out from the memory 15 in the area 43 on the transmission memory 10a as "high-speed data read response" (20b in FIG. 2).

The data frame with the "high-speed data read response" mounted thereon returns from each of the servo controllers to the PC 1 (28b in FIG. 2). It should be noted that the processing indicated by the reference numeral 28b in FIG. 2 is shown within the third master clock cycle in FIG. 2.

The microcomputer 5 of the high-speed serial communication interface 2 fetches, in the next master clock cycle (fourth master clock cycle in FIG. 2), the "high-speed data read response" stored in the area 43 on the receiving memory 11, writes the data in the area 55 on the dual port memory 6 (24c in FIG. 2), and sends an interrupt signal to the CPU 3 of the PC 1 (25c in FIG. 2). It should be noted that this interrupt signal is generated in a prespecified time from the falling edge (a reference timing) of the master clock 22.

As a result, the CPU 3 of the PC 1 reads out "high-speed data read response" from the area 55 on the dual port memory 6 according to this interrupt (26c in FIG. 2).

For example, in order to monitor data specified by this specifying information in a status where the data is updated in each cycle of the master clock cycle 22, specifying information (information such as an ID number and a key word) for specifying data to be read out from the servo controllers #1 to #n may be fixed and the high-speed data read instruction flag 58 may be fixed to be ON.

It should be noted that it is assumed in this embodiment that the high-speed data read processing is activated by the program in the PC 1.

Next description is made for "high-speed data write" processing for writing data rapidly in the servo controllers #1 to #n in synchronism to the master clock.

At first, the CPU 1 writes a "high-speed data write request" having "Information for specifying data to be written" (information for an address and a key word indicating a place with data to be written in on the memory 15) as well as "data to be written" in the area 53 on the dual port memory 6, and turns ON a "high-speed data write instruction flag" stored in the area 59 (26 in FIG. 2).

Then, the microcomputer 5 of the high-speed serial communication interface 2 writes "high-speed data write request" in the area 34 on the transmission memory 10, and turns ON the high-speed data write instruction flag in the area 37 (24a in FIG. 2).

Then, the data frame with the "high-speed data write request" and the high-speed data write instruction flag mounted thereon is transmitted to the servo controllers #1 to #n (27a in FIG. 2).

Each of the servo controllers #1 to #n fetches the "high-speed data write request" from the area 34 on the receiving memory 11a, and updates the data specified by this "high-speed data write request" (20b in FIG. 2).

When contents of the address specified by the "information for specifying data to be written" is to be updated on the memory 15 of the servo controllers #1 to #n for each master clock in accordance with the updating of the "data to be written", only the "data to be written" may be updated by fixing the "information for specifying data to be written" and fixing the high-speed data write instruction flag to be ON.

As desired operations are not expected to be executed according to an ordinary instruction in which effects of solidity of a mechanism section (not shown) driven by the servo controller are ignored, assuming a case as an example where an operation is effected by changing the instruction itself in association with actual operations, real time correction can easily be carried out by correcting a positional instruction value from the CPU 1 by using current values of data such as a position, a speed and torque of a motor read out from the servo controllers #1 to #n according to the "high-speed data read" and sending this corrected positional instruction value from the CPU 1 to the servo controllers #1 to #n according to the "high-speed data write".

It should be noted that there are various ways of using this high-speed data write processing such as being activated according to the program in the microcomputer 1 or being periodically activated in synchronism to the master clock.

Next description is made, as applications of the function of "high-speed data write", for a synchronous operation between motors each connected to different servo controllers.

Figure 17:
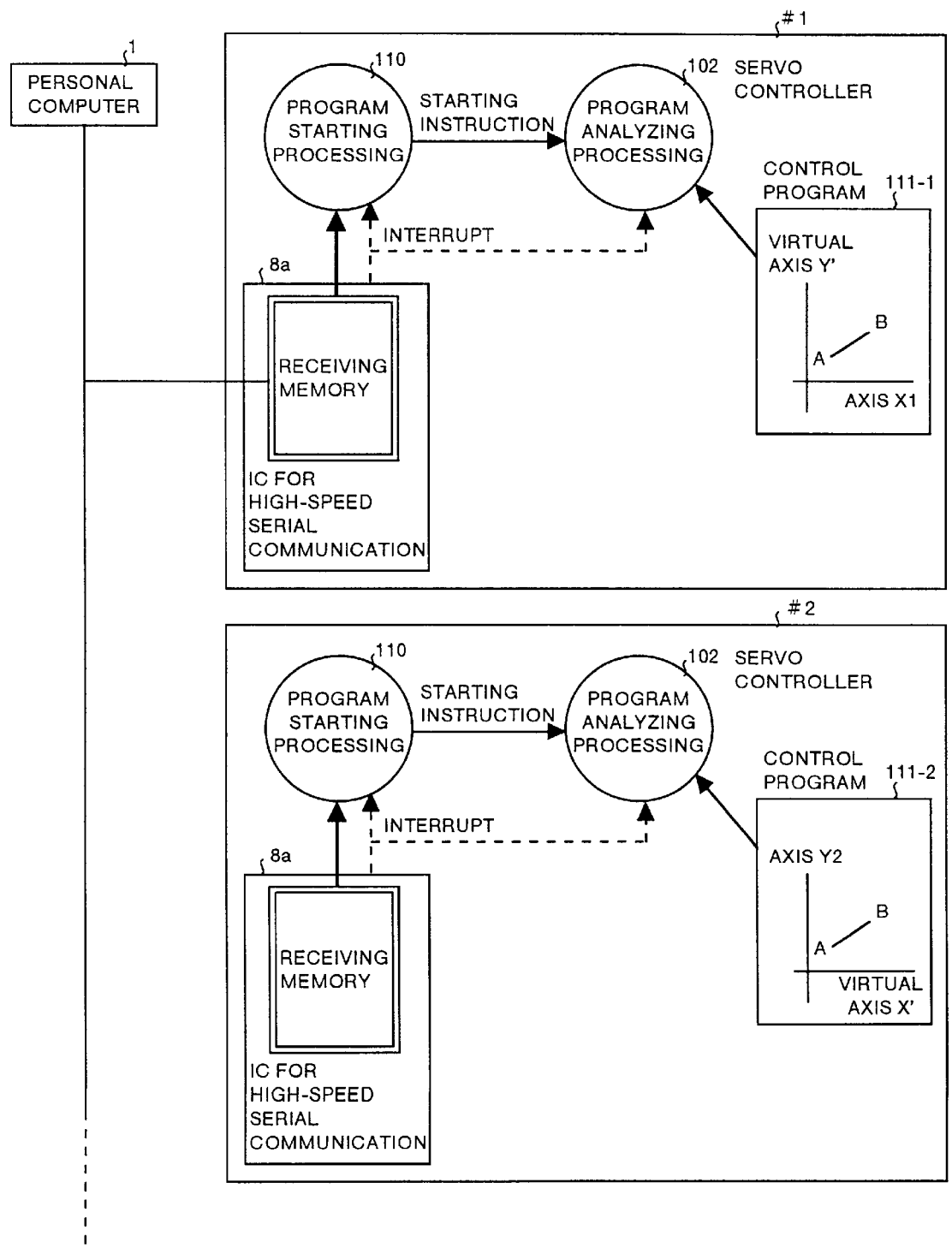
FIG. 17 is an explanatory view showing a method of synchronization between motors connected to a plurality of servo controllers in Embodiment 1 of the present invention.

FIG. 17 is an explanatory view showing a flow of a signal when linear interpolation is performed between an axis X1 connected to the servo controller #1 and an axis Y2 connected to the servo controller #2.

It is assumed in the figure that there is stored inside the servo controller #1 a control program 111-1 for positioning each point from a starting point A to an end point B based on the linear interpolation on a plane formed by two axes of the control axis X1 and a virtual axis Y'. It is also assumed that there is stored inside the servo controller #2 a control program 111-2 for positioning each point from a starting point A to an end point B based on the linear interpolation on a plane formed by two axes of the control axis Y2 and a virtual axis X'.

The virtual axis Y' is equivalent to the control axis Y2, the control axis X1 is equivalent to the virtual axis X', a trajectory AB by the control program 111-1 and that AB by the control program 111-2 have the same form, and an instruction speed by the control program 111-1 is the same as that by the control program 111-2.

At first, in the "high-speed data write", a starting instruction signal is sent to the servo controllers #1 and #2 in the same master clock cycle.

Program starting processing 110 monitors the starting instruction signal, sends an interrupt signal synchronously to the master clock to program analyzing processing 102 when having received the starting instruction signal (when the starting instruction signal on the receiving memory 11a is turned ON), and then gets the program analyzing processing 102 up and running.

The control program 111-1 is executed in the servo controller #1 and the control program 111-2 is executed in the servo controller #2 each by the program analyzing processing 102 for each controller, and the control program 111-1 and the control program 111-2 are concurrently executed.

As a result, interpolating operations are performed between the control axis X1 and the control axis Y2.

However, it is required that all the operations from execution of the control programs each by the program analyzing processing 102 up to instruction processing to each servo amplifier (not shown) are executed synchronously with to the master clock.

Next description is made for "stored data read" in which information such as an address group and a key word group each indicating a storage area on the memory 15 of each servo controller is previously stored in the servo controllers #1 to #n and contents in the storage area can easily be read out by turning ON a specified flag.

Figure 5:
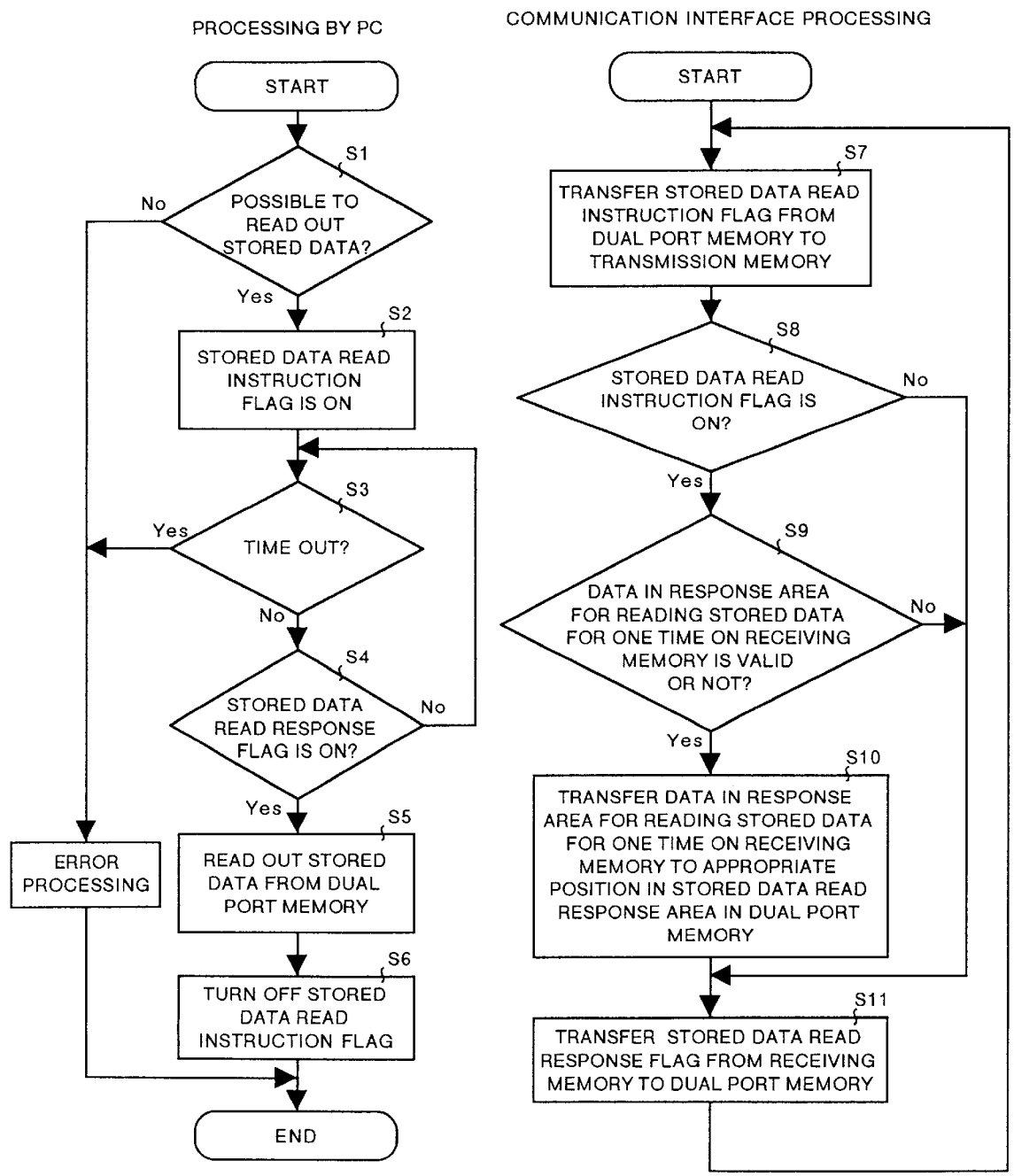
FIG. 5 is a flow chart showing a sequence of processing for reading out stored data in Embodiment 1 of the present invention.
Figure 6:
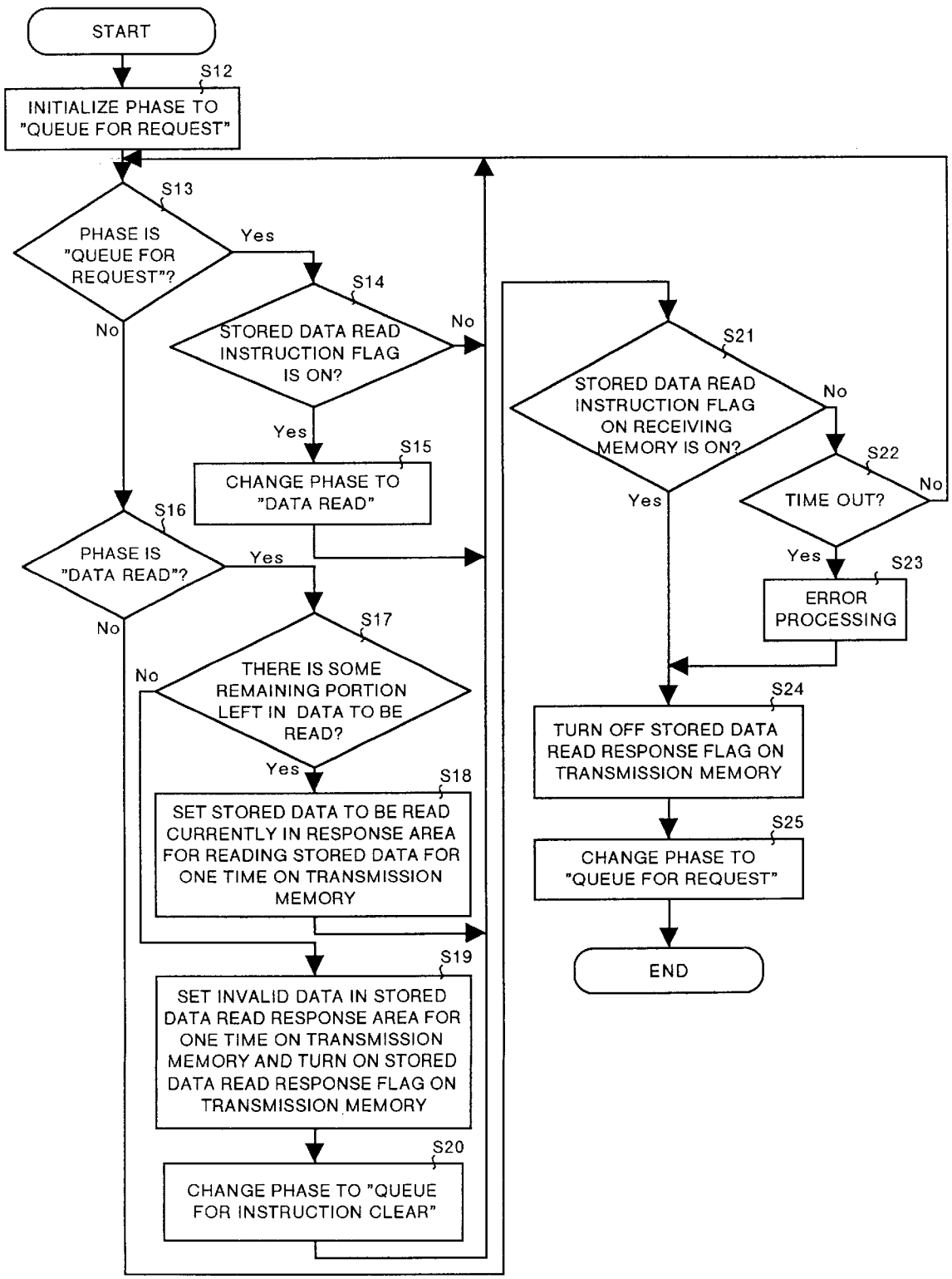
FIG. 6 is a flow chart showing a sequence of processing for reading out stored data in Embodiment 1 of the present invention.

FIG. 5 and FIG. 6 are flow charts indicating processing in the "stored data read". In FIG. 5, "Processing by PC" indicates contents of processing by the CPU 3 of the PC 1, and "communication interface processing" indicates contents of processing by the microcomputer 5 of the high-speed serial communication interface 2.

Next description is made for operations of "stored data read" with reference to FIG. 5 and FIG. 6.

In the "Processing by PC" shown in FIG. 5, determination is made in step S1 as to whether it is possible to read out stored data or not according to whether both of the stored data read instruction flag in the area 60 on the dual port memory 6 and the stored data read response flag in the area 61 thereon are OFF or not. When it is determined that the stored data can be read out, the processing shifts to step S2.

In step S2, the stored data read instruction flag in the area 60 on the dual port memory 6 is turned ON.

This stored data read instruction flag, which is ON, is written in the area 38 of the data frame information 32 on the transmission memory 10 and the data frame with the flag thereon is transferred to the servo controllers #1 to #n in step S7 of the "communication interface processing".

In FIG. 6, "Processing by servo controller" indicates contents of processing by each CPU 14 of the servo controllers #1 to #n.

In this "Processing by servo controller", the servo controller is initialized to a status of "queue for a request" in step S12. Determination is made in step S13 as to whether the phase is in "queue for a request" or not, and if it is determined that the phase is in the "queue for a request", the processing shifts to step S14.

Determination is made in step S14 as to whether the stored data read instruction flag is ON or not, and if it is determined that the flag is not ON, the processing returns to step S13, and if it is determined that the flag is ON, the processing shifts to step S15, the phase is set to a status of "data read" in step S15, and then the processing returns to step S13.

Namely, operations in step S13→step S14→step S13 are repeated until the stored data read instruction flag is turned ON, and when the stored data read instruction flag is turned ON, the servo controller is set to the status of "data read" and the processing shifts to step S16.

Determination is made in step S16 as to whether the phase is in the status of "data read" or not, and if it is determined that the phase is not in the status of "data read", the processing shifts to step S21, and if it is determined that the phase is in the status of "data read", the processing shifts to step S17.

Determination is made in step S17 as to whether there is some remaining portion left in data to be read out or not, and if it is determined that some remaining portion is left, the processing shifts to step S18.

In step S18, data read out from the memory 15 is written in the area 44 (a response area for "reading stored data" for one time) of the data frame information 40 on the transmission memory 10a, and the processing returns to step S13.

In the "communication interface processing", determination is made in step S8 as to whether the stored data read instruction flag on the dual port memory 6 is ON or not, and if it is determined that the stored data read instruction flag is not ON, the processing shifts to step S11, and shifts to step S9 if it is determined that the flag is ON.

Determination is made in step S9 as to whether a response to "stored data read" for one time is stored in the area 44 on the receiving memory 11 or not, and if it is determined that the response is not stored therein, the processing shifts to step S11, and shifts to step S10 if it is determined that the response is stored therein.

In step S10, the response for one time to this "stored data read" is transferred to a corresponding position of the area 56 on the dual port memory 6.

In step S111, a stored data read response flag is transferred from the receiving memory 11 to the area 61 on the dual port memory 6.

In the "processing by servo controller", operations in step S13→step S16→step S17→step S18→step S13 are repeatedly executed, and in the "communication interface processing", a response (for the number of stored data) to the "stored data read" is set in the area 56 on the dual port memory 6 by repeating operations in step S7→step S8→step S9→step S10→step S11→step S7.

In step S17, as described above, when all the data has been read out, if it is determined that no remaining portion in data to be read is left, the processing shifts to step S19.

In step S19, invalid data is written in the area 44 on the transmission memory 10a as a response for one time to the "stored data read", the stored data read response flag stored on the transmission memory 10a is turned ON, and the processing shifts to step S20.

The servo controller is set to a status of "queue for instruction clear" in step S20, and the processing returns to step S13. The stored data read response flag stored on the transmission memory 10a is transferred to the high-speed serial communication interface 2.

In the "communication interface processing", the stored data read response flag is written in the area 61 on the dual port memory 6 in step S11.

In the "processing by PC", operations in step S343 step S4→step S3 are repeated, the stand-by state is continued until the stored data read response flag stored in the area 61 is turned ON, the processing shifts from step S4 to step S5 when the stored data read response flag is turned ON, a response to the "stored data read" is fetched from the area 56 in step S5, the stored data read instruction flag stored in the area 60 on the dual port memory 6 is turned OFF in step S6, and the processing is finished.

In the "communication interface processing", the stored data read instruction flag, which is OFF, in the area 60 on the dual port memory 6 is written in the area 38 on the transmission memory 10, and transferred to the servo controllers #1 to #n.

In the "Processing by servo controller", operations in step S13→step S16→step S21→step S22→step S13 are repeatedly executed, and the stand-by state is continued until the stored data read instruction flag stored in the area 38 on the receiving memory 11a is turned OFF.

When the stored data read instruction flag is turned OFF, the processing shifts from step S21 to step S24, the stored data read response flag stored in the area 46 on the transmission memory 10a is turned OFF in step S24, the servo controller is set to a status of "queue for request" in step S25, and the processing is finished.

It should be noted that this stored data read processing may be started by the program or the like in the microcomputer 1, but it is assumed in this embodiment that the processing is periodically started by the timer inside the PC 1 in a cycle corresponding to a data length.

Next description is made for the "multi-purpose processing" for executing any of various types of processing such as processing in data random write, processing in direct operation, sector-read processing, sector-write processing, and processing in character communication.

Figure 7:
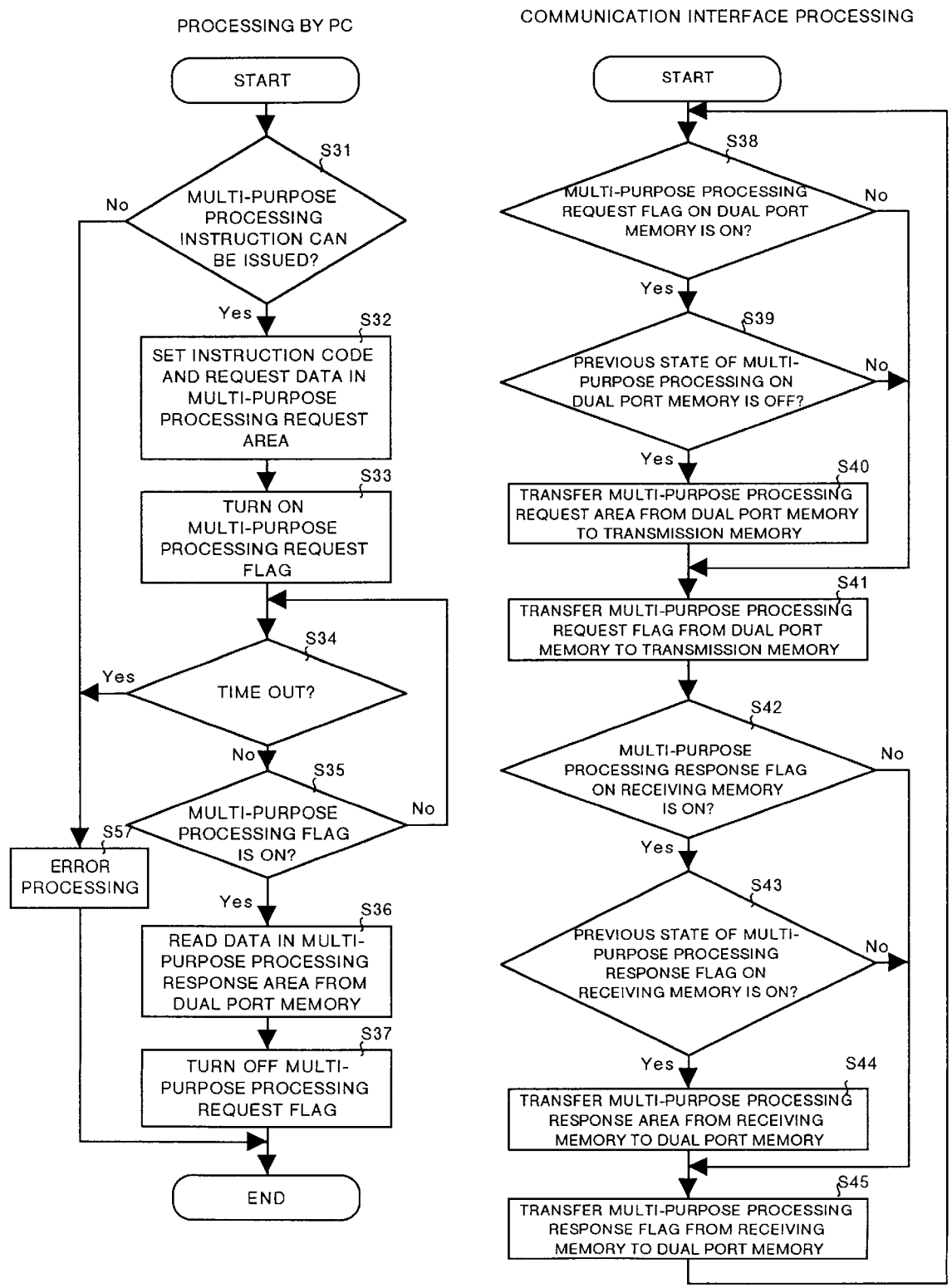
FIG. 7 is a flow chart showing a sequence of processing for multi-purpose processing in Embodiment 1 of the present invention.
Figure 8:
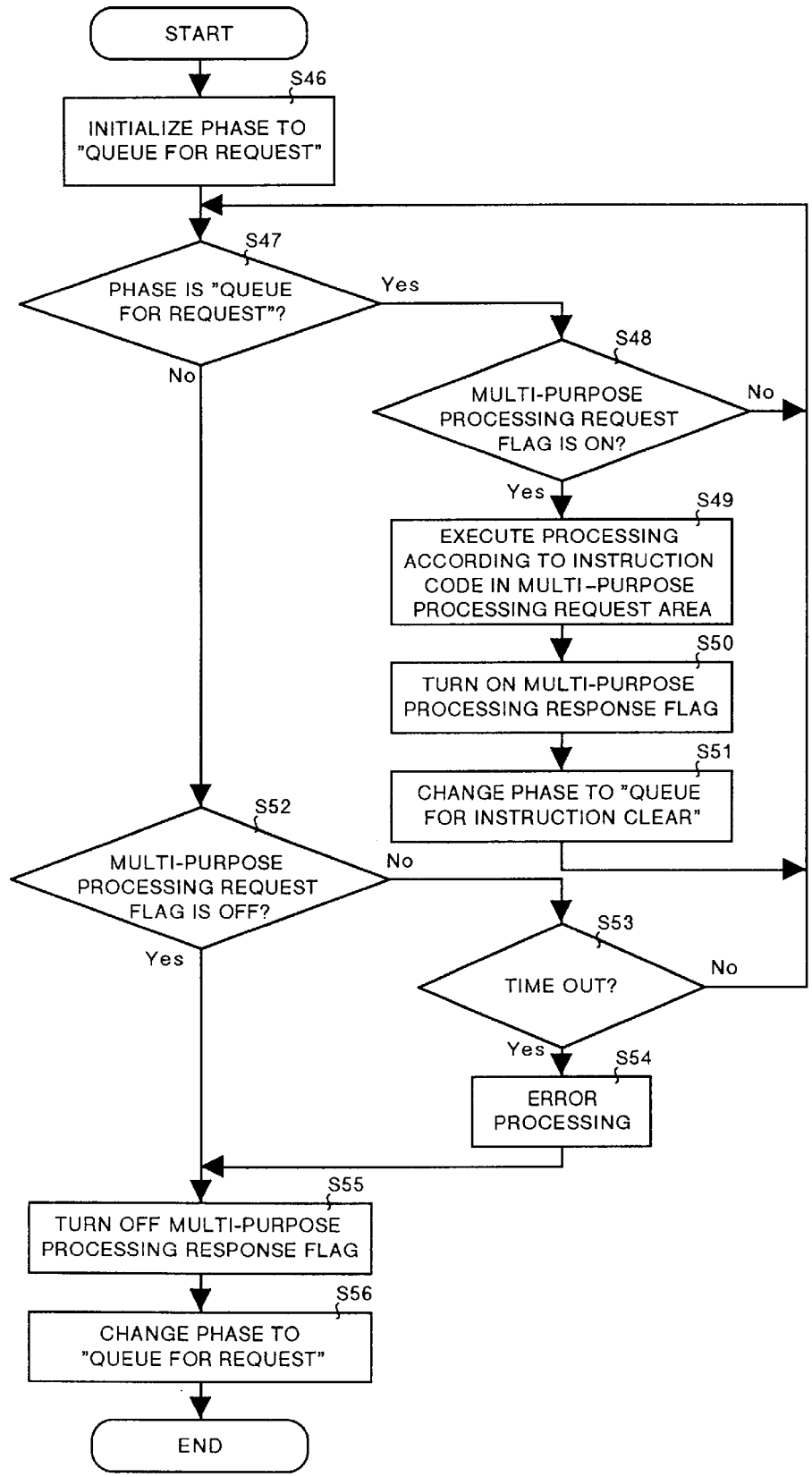
FIG. 8 is a flow chart showing a sequence of processing for multi-purpose processing in Embodiment 1 of the present invention.

FIG. 7 and FIG. 8 are flow charts each showing contents of common processing in the "multi-purpose processing", and FIG. 9 shows structures of a request area as well as of a response area.

In the "processing by PC" in FIG. 7, determination is made in step S31 as to whether both the multi-purpose processing request flag stored in the area 62 on the dual port memory 6 and the multi-purpose processing response flag stored in the area 63 thereon are OFF or not, it is determined that execution of the "multi-purpose processing" is possible so long as both of the flags are OFF, and the processing shifts to step S32.

It is determined that execution of the "multi-purpose processing" is not possible unless the condition that both of the flag are OFF is satisfied, and the processing shifts to step S57.

Error information is notified to a servo controller alarm managing task 85 in step S57, and the "processing by PC" is finished.

In step S32, instruction code of "multi-purpose processing request" is set in an area 71 of the area 54 on the dual port memory 6 and also request data is set in an area 72 thereof.

In step S33, the multi-purpose processing request flag stored in the area 62 on the dual port memory 6 is turned ON, and the processing shifts to step S34.

Next description is made for the "communication interface processing" with reference to FIG. 7. Determination is made in step S38 and step S39 as to whether the multi-purpose processing request flag is changed from OFF to ON or not according to a previous value and a current value of the multi-purpose processing request flag stored in the area 62 on the dual port memory 6, and if it is determined that the flag has been changed from OFF to ON, the processing shifts to step S40, and shifts to step S41 if it is determined that the flag has not been changed from OFF to ON.

In step S40, the "multi-purpose processing request" stored in the area 54 on the dual port memory 6 is transferred to the area 35 on the transmission memory 10.

In step S41, the multi-purpose processing request flag stored in the area 62 on the dual port memory 6 is transferred to the area 39 on the transmission memory 10, and the processing shifts to step S42.

It should be noted that, when this multi-purpose processing request flag is transferred to the area 39 on the transmission memory 10, the "multi-purpose processing request" and the multi-purpose processing request flag set in the transmission memory 10 are transferred to the servo controllers #1 to #n.

Next description is made for "processing by servo controller".

Controlling for multi-purpose processing by a servo controller is initialized to the status of "queue for a request" in step S46.

Determination is made in step S47 as to whether the "queue for a request" is effected or not, and if it is determined that the "queue for a request" is effected, the processing shifts to step S48, and shifts to step S52 if it is determined that the "queue for a request" is not effected.

Determination is made in step S48 as to whether each of the multi-purpose processing request flags stored in the areas 39 of the areas 32-1 to 32-n on the receiving memory 11a is ON or not, and if it is determined that the flags are OFF, the processing returns to step S47, and operations in step S47→step S48→step S47 are repeated until the multi-purpose processing request flags are turned ON.

When the multi-purpose processing request flags have been turned ON, the processing shifts from step S48 to step S49.

In step S49, instruction code stored in the area 71 of the area 35 is read out, and the multi-purpose processing corresponding to this instruction code is executed. The result of this processing is set in the area 45 on the transmission memory 10a as "a response to the multi-purpose processing".

In step S50, the multi-purpose processing response flag stored in the area 47 on the transmission memory 10a is turned ON, and the processing shifts to step S51.

In step S51, the control is set to a state of "waiting for instruction clear", and the processing returns to step S47.

The "response to the multi-purpose processing" and the multi-purpose processing response flag set in the transmission memory 10a are transferred to the high-speed serial communication interface 2.

In the "communication interface processing", determination is made in step S42 and step S43 as to whether the multi-purpose processing response flag stored in the area 47 on the receiving memory 11 is changed from OFF to ON or not, and if it is determined that the flag has been changed, the processing shifts to step S44, and shifts to step S45 if it is determined that the flag has not been changed.

In step S44, the "response to the multi-purpose processing" stored in the area 45 on the receiving memory 11 is transferred to the area 57 on the dual port memory 6.

In step S45, the multi-purpose processing response flag stored in the area 47 on the receiving memory 11 is transferred to the area 63 on the dual port memory 6.

Next description is made for "processing by PC". At first, operations in step S34→step S35→step S34 are repeated until the multi-purpose processing response flag stored in the area 63 on the dual port memory 6 is turned ON, and when the multi-purpose processing response flag has been turned ON, the processing shifts from step S35 to step S36.

In step S36, "response to the multi-purpose processing" stored in the area 57 on the dual port memory 6 is read out. In step S37, the multi-purpose processing request flag stored in the area 62 on the dual port memory 6 is turned OFF, and the "processing by PC" is finished.

Next description is made for "processing by servo controller".

Although the servo controller kept in the state of "waiting for instruction clear" repeats operations in step S47→step S52→step S53→step S47 until the multi-purpose processing request flag stored in the area 39 on the receiving memory 11a is turned OFF, when the multi-purpose processing request flag is turned OFF, the processing shifts from step S52 to step S55.

In step S55, the multi-purpose processing response flag stored in the area 47 on the transmission memory 10a is turned OFF, and the control is set to a status of "queue for a request" in step S56, and the processing is finished.

Next description is made for how internal data in the servo controllers #1 to #n is periodically read out by a function of "stored data read" and contents of the stored data in the servo controllers #1 to #n are rewritten by each of the plurality of application programs through execution of the data random write processing which is one of the "multi-purpose processing".

Figure 10:
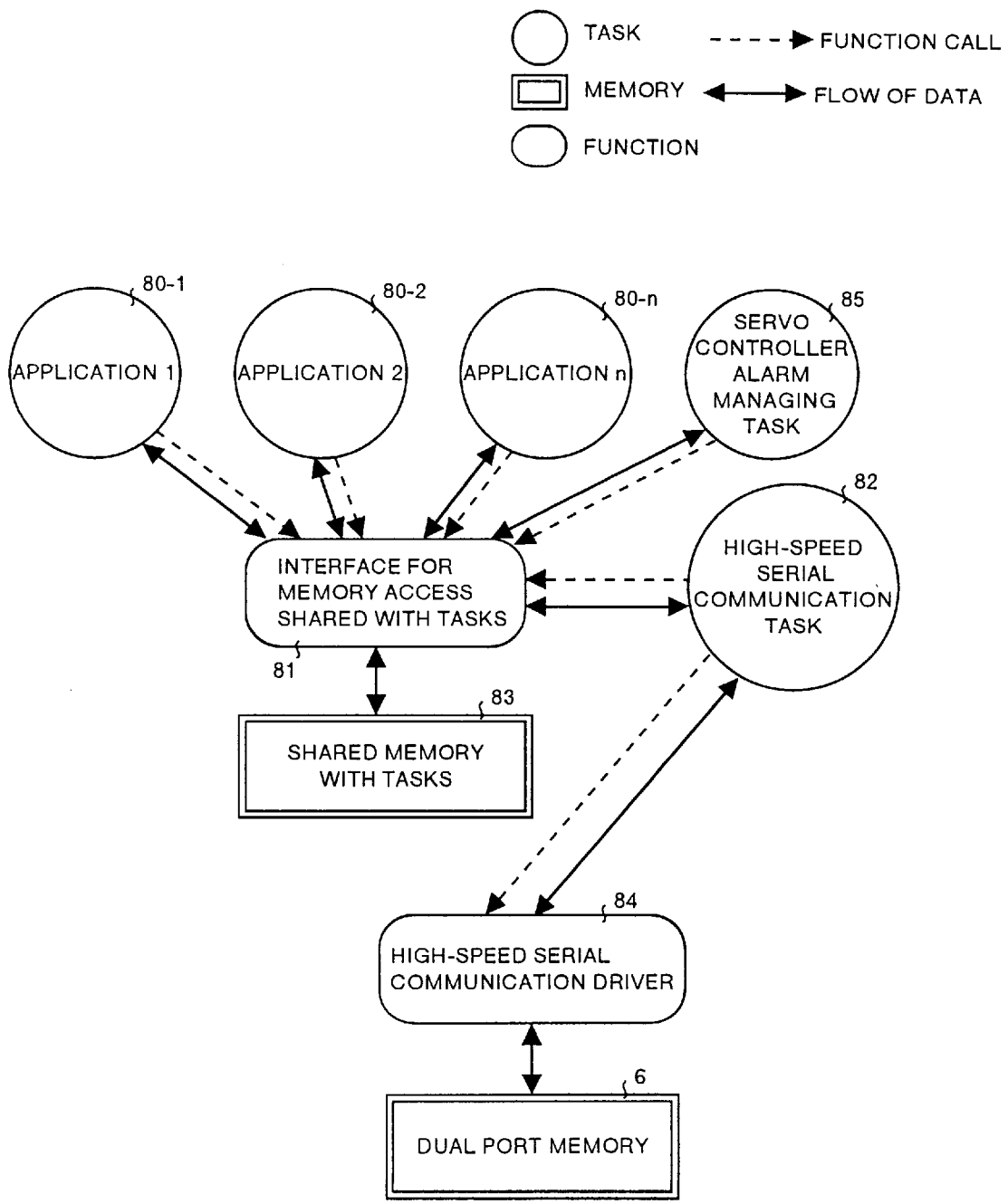
FIG. 10 is an explanatory view showing a flow of information when internal data in a controller is read or written by a plurality of applications executed on a personal computer in Embodiment 1 of the present invention.
Figure 11:
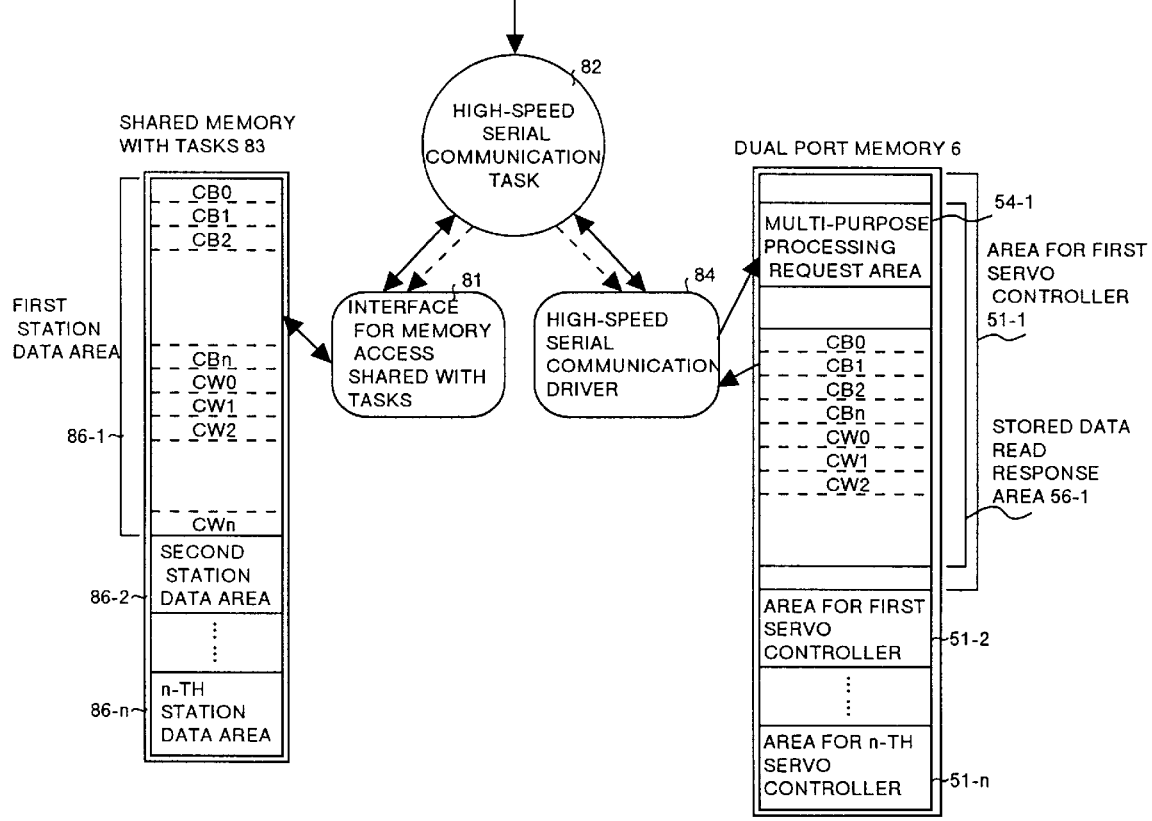
FIG. 11 is an explanatory view showing a method of allocating internal data in a servo controller to a shared memory with tasks on a personal computer in Embodiment 1 of the present invention.

FIG. 10 and FIG. 11 are block diagrams each showing a flow of information in this processing. In FIG. 10 and FIG. 11, designated at the reference numerals 80-1 to 80-n are applications, at 81 an interface for memory access shared with tasks, at 82 a high-speed serial communication task, at 83 a shared memory with tasks, at 84 a high-speed serial communication driver, at 85 a servo controller alarm managing task, and at 87 a stored data specification data.

A stored data area is provided in each station (each of the servo controllers #1 to #n) on the shared memory with tasks 83. A plurality of areas (memory numbers CB0 to CBn) for storing therein bit data and a plurality of areas (memory numbers CW0 to CWn) for storing therein byte data comprising 1 to several bytes are provided in each of the stored data areas provided in each station.

Provided in the stored data specification table 87 for each station are columns for storing therein information comprising a data ID, a memory number and a station number for each memory number. Contents specified by this data ID is internal data stored on the memory 15 of the servo controller.

There is set a correlation, according to this stored data specification table 87, between a memory number indicating a memory address on the shared memory with tasks 83 and a data ID indicating an address where the internal data for the servo controller is stored.

It should be noted that FIG. 11 shows each contents of setting as one example in the stored data specification table 87, shared memory with tasks 83, and the dual port memory 6.

Figure 12:
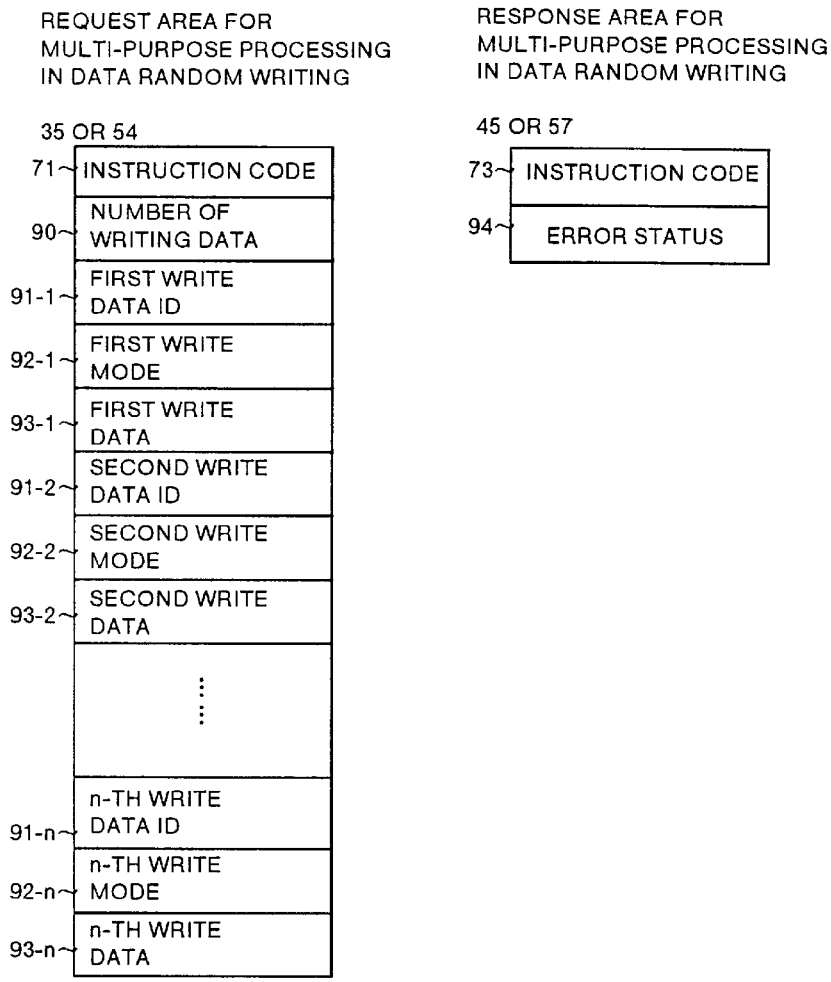
FIG. 12 is views showing structures of a request area as well as a response area for multi-purpose processing used in data random write in Embodiment 1 of the present invention.

FIG. 12 shows contents of the area 54 (or the area 35 of the data frame) on the dual port memory 6 and contents of the area 57 (or the area 45 of the data frame) on the dual port memory 6 in the "Data random write processing".

Stored in the area 54 (or the area 35) is request information when "data random write" is requested, and response information is stored in the area 57 (or the area 45).

Instruction code indicating "data random write" is set in the area 71 of the area 54 (or the area 35), and the number of points for data to be written on the memory 15 of the servo controller is set in an area 90.

Set in an area 91-1 to an area 91-n are ID numbers each indicating an address of the memory 15 where internal data is stored as each of first to n-th write data IDs respectively.

Set in an area 92-1 to an area 92-n are attributes such as a size of data (e.g., 1 bit, 8 bits, 16 bits, 32 bits) as each of first to n-th write data modes respectively, and first to n-th write data is set in an area 93-1 to an area 93-n respectively.

Instruction code indicating the data random write processing is set in an area 73 of the area 57 (or the area 45), and code indicating presence or absence of error as an error status and a cause of the error is set in an area 94 of the area 57 (or the area 45).

Description is made for a flow of data and contents of processing with reference to FIG. 10 and FIG. 11.

It is assumed in the system according to Embodiment 1 of the present invention that the processing for "reading stored data" is periodically executed, so that, if data IDs set in the stored data specification table 87 are previously stored in the servo controller, each of the data specified by those data ID is read out from the memory 15 of the servo controller and set in the areas 56-1 to 56-n on the dual port memory 6 as "data read response" in the order shown in the stored data specification table 87.

In association with this operation, the high-speed serial communication task 82 reads out each contents of the areas 56-1 to 56-n on the dual port memory 6 through the high-speed serial communication driver 84, recognizes which memory number the read out contents belongs to by referring to the stored data specification table 87, and writes the read out data in the corresponding area on the shared memory with tasks 83 through the interface 81 for memory access shared with tasks.

It should be noted that the application program 80-1 to application program 80-n can read out stored data from the shared memory with tasks 83 through the interface 81 for memory access shared with tasks.

When the "multi-purpose processing" is executed by any of the application program 80-1 to application program 80-n after any of the data on the shared memory with tasks 83 is rewritten, the high-speed serial communication task 82 detects the rewritten data according to the flag the data has, reads out the data from the shared memory with tasks 83, obtains a data ID as well as a station number of the servo controller each corresponding to the data from the stored data specification table 87, and rewrites corresponding internal data stored on the memory 15 of the servo controller among the servo controllers #1 to #n.

As "stored data read" is periodically executed, by previously storing information such as occurrence status of alarm in the servo controllers #1 to #n and a data ID indicating a storage address of alarm contents in the servo controller, the occurrence status of alarm in the servo controllers #1 to #n and the alarm contents are periodically written on the shared memory with tasks 83.

The servo controller alarm managing task 85 reads out, through the interface 81 for memory access shared with tasks, contents of the shared memory with tasks 83, monitors whether any alarm occurs or not, and validates, if occurrence of alarm is monitored, an instruction corresponding to the alarm contents stored on the shared memory with tasks 83 (instructions stored in the stored data specification table 87 such as a reset instruction for resetting the status of emergency stop or the like in the servo controller, or an instruction concerning manual operations such as program reset for forcefully terminate a program or return to the point of origin) through the interface 81 for memory access shared with tasks according to execution of this "multi-purpose processing", and processing for recovery after the alarm occurs can be executed.

Figure 21:
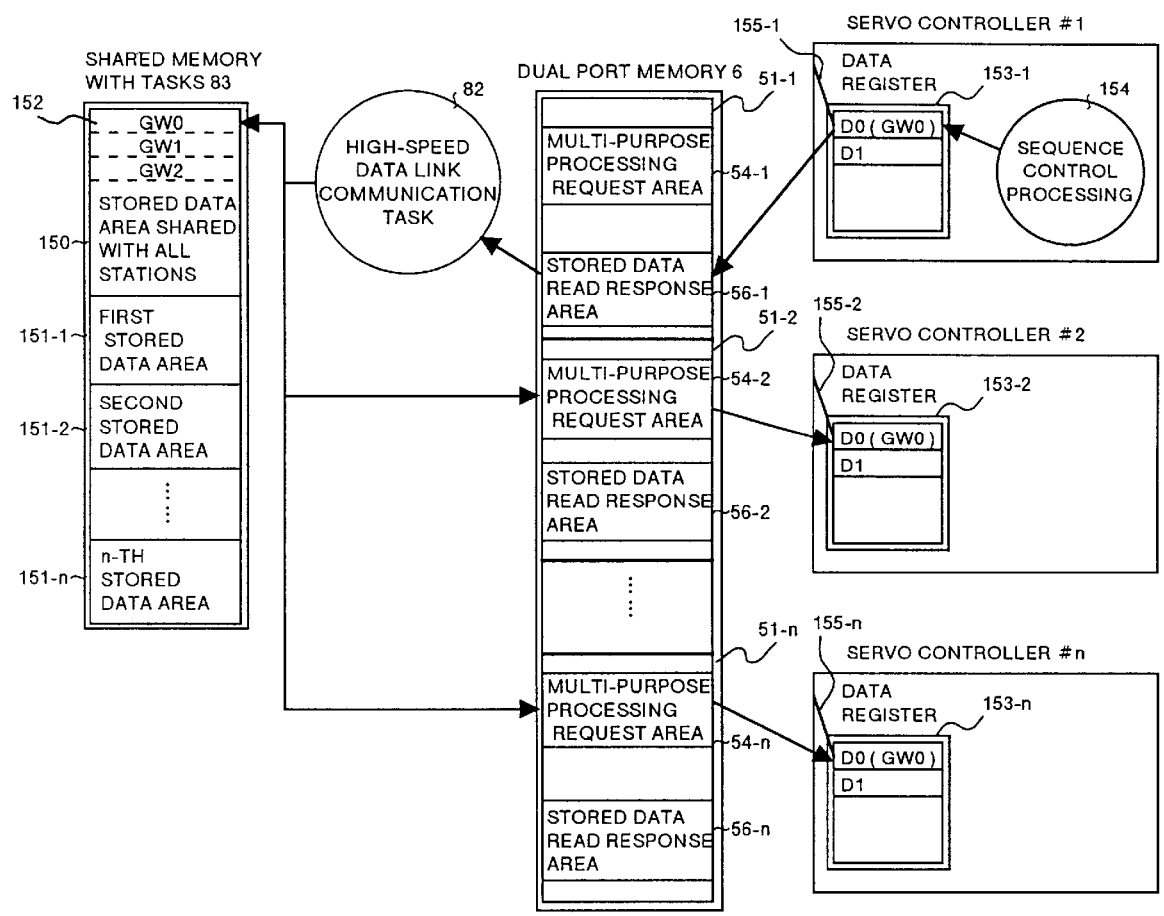
FIG. 21 is views showing structures in detail of shared internal data when the internal data in a plurality of servo controllers is shared in the servo control system in Embodiment 1 of the present invention.

Next description is made for a case where internal data of a servo controller is shared with a plurality of servo controllers by executing "stored data read" and "data random write" in the multi-purpose processing in the system employing the shared memory with tasks 83 with reference to FIG. 21.

There is omission, in FIG. 21, of figures of the high-speed serial communication driver 84 as well as the interface 81 for memory access shared with tasks each shown in FIG. 10 and of the transmission memories 10, 10a as well as the receiving memories 11, 11a each shown in FIG. 1.

Provided in the shared memory with tasks 83 are areas 151-1 to 151-n for storing therein stored data for the first station to the n-th station (servo controller #1 to servo controller #n) and an area 150 for storing therein stored data shared with all stations. It should be noted that not only one stored data by also stored data shared with all stations can be stored in the area 150.

In this case, as described below, by previously storing therein internal data so that the internal data having a data ID of D0 is changed to stored data GW0 shared with all stations, if data D0 is rewritten in any of the servo controllers, for example, in the servo controller #1, each of the data D0 in the servo controllers #2 to #n is rewritten.

As "stored data read" is periodically executed, in this case, D0 of the servo controller #1 and contents of D0 are stored in the area 56 on the dual port memory 6 as "stored data read response" in the first station. In association with this operation, the high-speed serial communication task 82 transfers the contents to an area 152 of the stored data area 150 shared with all stations on the shared memory with tasks 83. Then, according to the contents of the area 56 on the dual port memory 6, a particular "multi-purpose processing request" corresponding to the data random write processing whose configuration is shown in FIG. 12 is written in the area 54 on the dual port memory 6 by any of the applications 80-1 to 80-n, and when the "multi-purpose processing" is executed, this contents is stored in the area 54 of the area 51-2 to area 51-n on the dual port memory 6, and is written in D0 on each of the memories 15 of the servo controllers #2 to #n through each transmission line.

As the processing for reading stored data is repeatedly executed in a specified cycle, if arbitrary data is written in D0, for example, by a function 154 of sequence control processing of the servo controller #1, the data is transferred to each D0 of the servo controllers #2 to #n in the next processing cycle.

Although description was made first for the case where the servo controller #1 rewrites contents of D0, the same processing is executed even when any other servo controller rewrites contents of a data register.

When the PC 1 rewrites contents of the area 152, corresponding to D0, in the stored data area shared with all stations on the shared memory with tasks 83, contents of each of D0 in the servo controllers #1 to #n is also rewritten in the next processing cycle.

As described above, it is easily possible to directly change internal data of other servo controller by the control program or the like of the station or to notify a status of current processing in the servo controller of the station.

It should be noted that, by storing a plurality of data IDs in the stored data area shared with all stations, the contents of the memories indicated by the plurality of data ID can concurrently be transferred to other servo controllers.

Next description is made for processing of a direct operation in the "multi-purpose processing" through which the control program is sent from the PC 1 to the servo controllers #1 to #n.

Figure 13:
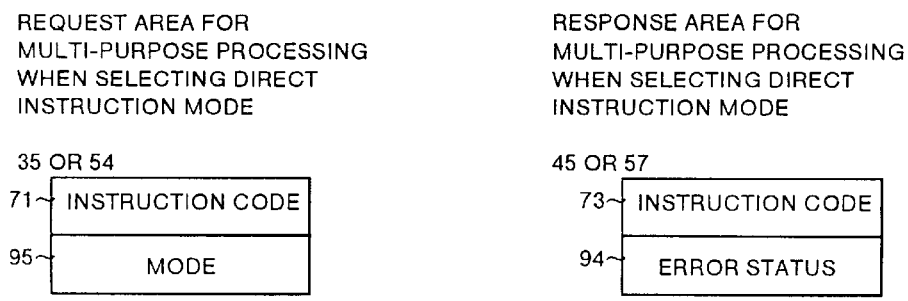
FIG. 13 is views showing structures of a request area as well as a response area for multi-purpose processing used for selection of direct instruction mode in Embodiment 1 of the present invention.

FIG. 13 is views of data structures showing contents stored in the area 54 on dual port memory 6 as well as contents stored in the area 57 thereon in "direct instruction of mode selection".

FIG. 14 is views of data structures showing contents stored in the area 54 (and the area 35 of a data frame) on dual port memory 6 as well as contents stored in the area 57 (and the area 45 of a data frame) thereon in direct instruction of "recognizing a buffer remaining size".

FIG. 15 is views of data structures showing contents stored in the area 54 (and the area 35 of a data frame) on dual port memory 6 as well as contents stored in the area 57 (and the area 45 of a data frame) thereon in "direct transfer instruction of a control program".

In accordance with this "direct instruction for mode selection", it is possible to select an operation by an ordinary program to a direct operation in which a control program is directly transferred, and vice versa.

When the "multi-purpose processing" is executed by setting instruction code indicating processing for mode selection in the area 71 of the area 54 on the dual port memory 6 and also setting code for specifying whether the direct operation is validated or invalidated in an area 95 of the area 54, the data frame with those contents thereon is sent to each servo controller, and a response indicating acceptance or unacceptance of the request is sent back from the servo controller as described below.

Namely, a data frame on which instruction code indicating selection of mode is set in the area 73 of the area 35 and which error status code indicating presence or absence of any error as well as a cause of the error when it occurs is set in the area 94 of the area 35 is sent to the PC 1, and each of the information is stored in each corresponding area on the dual port memory 6.

Figure 16:
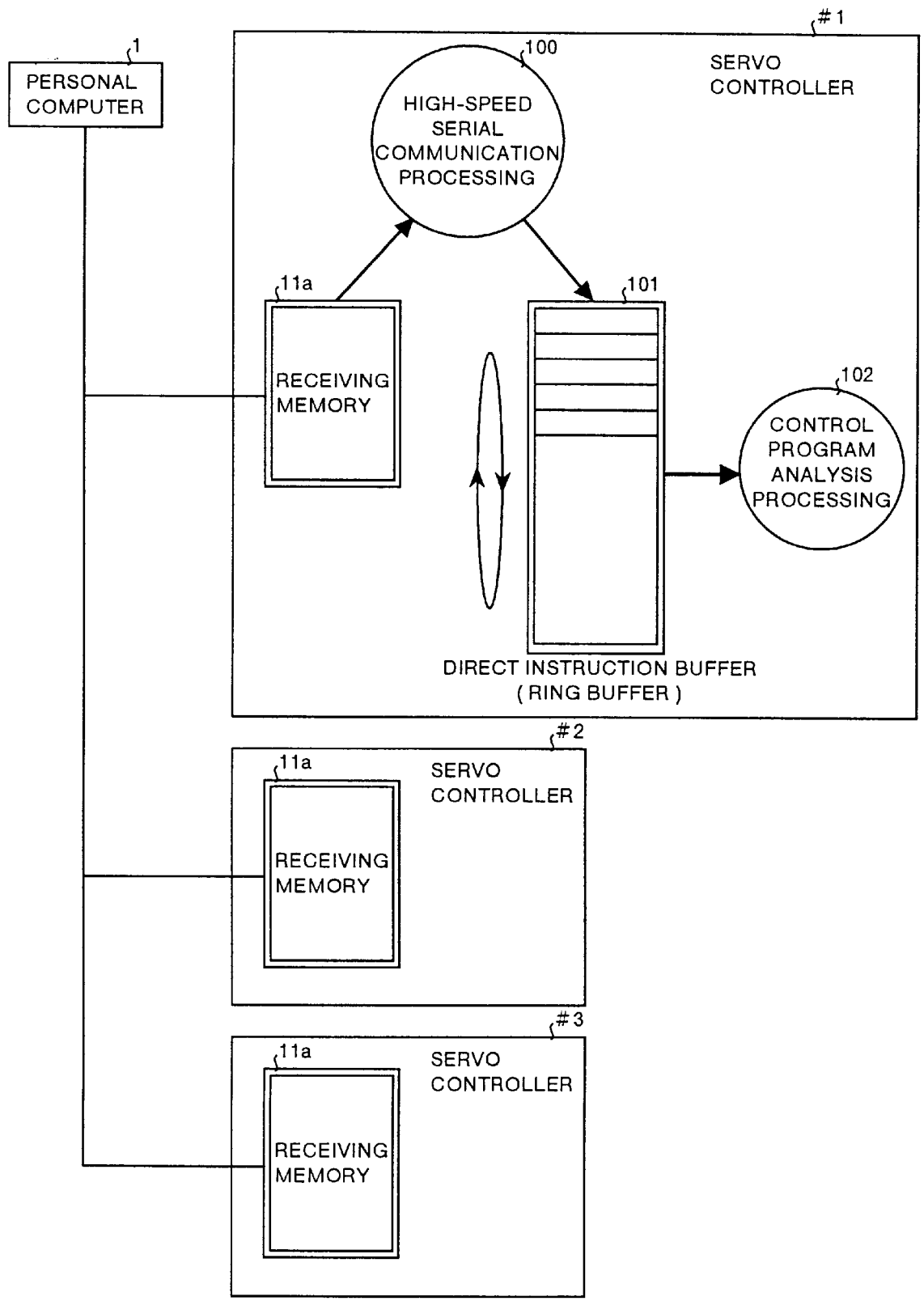
FIG. 16 is a block diagram showing a flow of data when writing a control program according to a direct instruction in Embodiment 1 of the present invention.

The "direct instruction of recognizing a buffer remaining size" in the "multi-purpose processing" has a function of checking a size of an available area in a direct instruction buffer 101 shown in FIG. 16. The direct instruction buffer 101 on the memory 15 is a buffer memory for temporarily storing thereon a control program sent from the PC 1 to the servo controller.

When the "multi-purpose processing" is executed by setting instruction code indicating recognition of a buffer remaining size in the area 71 of the area 54 on the dual port memory 6, transaction of corresponding data frame is performed between the PC and the servo controller, and then, according to the "response to the multi-purpose processing" from the servo controller, the instruction code indicating recognition of a buffer remaining size is set in the area 73 of the area 57, the error status code indicating presence or absence of any error as well as a cause of the error when it occurs is set in the area 94 of the area 57, and the instruction buffer remaining size (size of the available area in the direct instruction buffer 101) is set in the area 96 of the area 57.

According to this "direct transfer instruction of a control program", the control program can be transmitted from the PC 1 to the servo controller (#1 to #n).

When this instruction is to be executed, as shown in FIG. 15, instruction code indicating the "direct transfer instruction of a control program" is previously set in the area 71 of the area 54 on dual port memory 6, the number of blocks of the control program to be transferred as the number of instruction blocks is set in an area 97 of the area 54, the first block program code size is set in an area 98-1 of the area 54, the second block program code size in an area 98-2 . . . the n-th block program code size in an area 98-n respectively, and also the first block program code is set in an area 99-1 of the area 54, the second block program code in an area 99-2 . . . the n-th block program code in an area 99-n respectively, and, when the "multi-purpose processing" is executed after all those processing described above, the control program is written in the direct instruction buffer 101 of the servo controller (#1 to #n), and a response is sent back from the servo controller (#1 to #n).

The instruction code indicating the direct transfer instruction of the control program is set in the area 73 of the area 57 on the dual port memory 6 according to the response, the error status code indicating presence or absence of any error as well as a cause of the error when it occurs is set in the area 94 of the area 57, and the size of an available area in the direct instruction buffer 101 after the control program has been written therein is set in the area 96 of the area 57.

In this "direct transfer of the control program", at first, operation mode is set in the direct operation mode according to the "direct instruction for mode selection".

After recognition of the available area size of the direct instruction buffer 101 according to the "direct transfer of recognizing a buffer remaining size", the control program is written in the available area of this buffer according to the "direct instruction of transferring the control program".

FIG. 16 shows a flow of data in the "direct transfer of the control program".

At first, the control program having been written by PC 1 in an area 99-1 to an area 99-n in the area 54 on the dual port memory 6 is transferred to the receiving memory 11a of each of the servo controller #1 to #n.

This transferred control program is transferred to the direct instruction buffer 101 according to the high-speed serial communication processing 100. In the control program analyzing processing 102, the processing (e.g., processing for converting the program to an instruction for a servo amplifier) is executed by reading out the control program written in the direct instruction buffer 101 by one block by one block.

Description is made for a case where internal data of each of the servo controllers #1 to #n is read out through a filing system of the PC 1 by allocating the servo controllers #1 to #n as memories for the disk drives or the like in the PC 1 and using the sector-read function as well as the sector-write function in the "multi-purpose processing". It should be noted that, file security is also possible in this case.

In order to enable access to each internal memory (memory 15) of the servo controllers #1 to #n from the filing system of the PC 1, each of the internal memories of the servo controllers #1 to #n is divided into minimum access units (a sector with a specified capacity, and block device information is added to the unit similarly to a file format in the filing system of the PC 1.

With this function, internal data of servo controllers can easily be accessed by, for example, a filing managing tool such as a File manager attached to the operating system by the PC as well as by commercial applications operating on this operating system.

Figure 18:
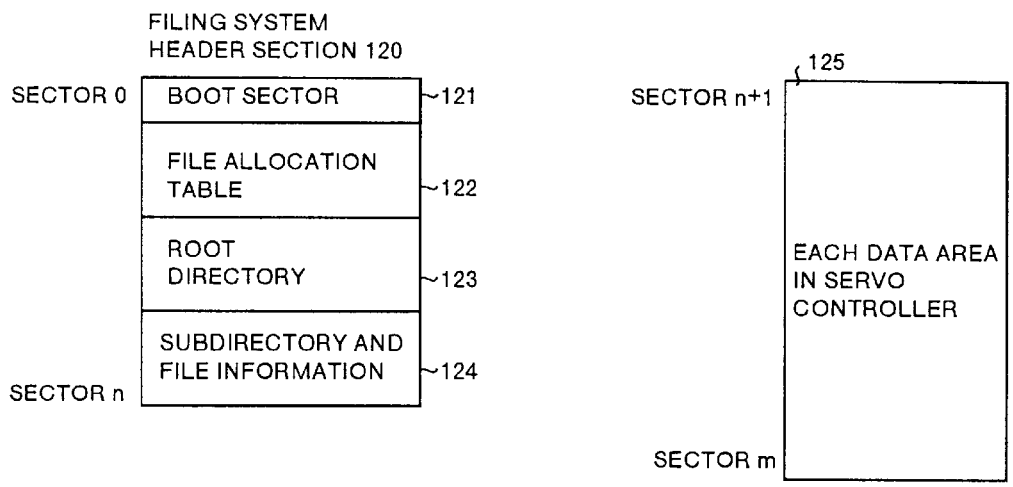
FIG. 18 is views showing structures of files when accessing an internal memory in a servo controller as a file in Embodiment 1 of the present invention.

FIG. 18 is views each showing a structure of an ordinary file in the filing system.

In the figure, the reference numeral 120 indicates a header section. Stored in an area from Sector 0 to Sector n is information indicating a structure of the internal file of each servo controller.

The reference numeral 121 indicates an area for storing therein boot information describing a size of a root directory or the like.

The reference numeral 122 indicates an area for storing therein a file allocation table showing allocation of clusters to files.

The reference numeral 123 indicates an area for storing therein root directories.

The reference numeral 124 indicates an area for storing therein subdirectory and file information.

It should be noted that sectors are successively allocated to areas in the header section 120 such as Sector 0 is allocated to an area 121, Sector 1 to an area 122, Sector 2 to an area 123 . . . .

The reference numeral 125 indicates an area for storing therein each data (such as various parameters, a PLC device, and a control program) in the servo controller. Sector n+1 to Sector m are allocated to this area 125.

Each of the sectors is not required to be arranged on the memory in their continuous numbers, access may be made to any sector by specifying the sector number thereof.

"Sector-read function" and "sector-write function" in the "multi-purpose processing" described below are used for reading and writing internal data from and to the servo controllers #1 to #n from the PC 1.

Figure 19:
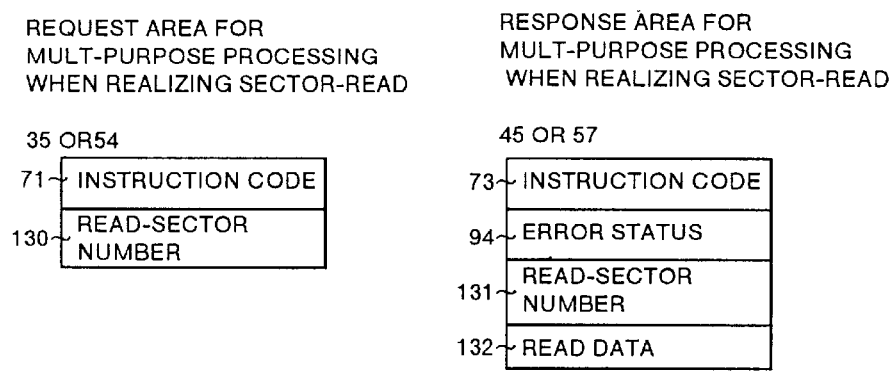
FIG. 19 is views showing structures of a request area as well as a response area for multi-purpose processing used when realizing sector-read in Embodiment 1 of the present invention.

FIG. 19 is views showing data structures of the area 54 (and area 35 of a data frame) on the dual port memory 6 and the area 57 (or area 45) in the "sector-read" of the "multi-purpose processing".

Figure 20:
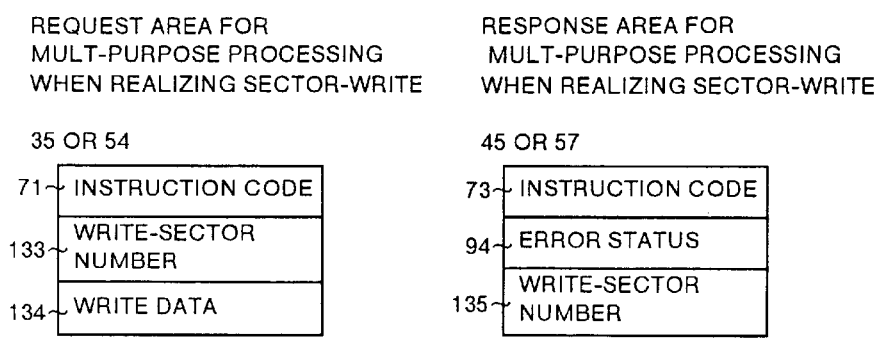
FIG. 20 is views showing structures of a request area as well as a response area for multi-purpose processing used when realizing sector-write in Embodiment 1 of the present invention.

FIG. 20 is views showing data structures of the area 54 (or area 35) and the area 57 (and area 45 of a data frame) in the "sector-write".

When the "multi-purpose processing" is executed under conditions that instruction code indicating the sector-read is stored in the area 71 of the area 54 on the dual port memory 6 and the number of the sector to be read out is stored in an area 130 of the area 54, the servo controllers #1 to #n perform the following operations from (1) to (5).

(1) The instruction code indicating "sector-read" is set in the area 73 of the area 45 in a data frame.

(2) The error status code indicating presence or absence of any error as well as a cause of the error is set in an area 94 of the area 45 therein.

(3) The number of the read out sector is set in an area 131 of the area 45 therein.

(4) Contents of the area on the memory 15 specified by the number of the read out sector is set in an area 132 of the area 45 therein as "read data".

(5) The data frame with the contents of the area 45 in which particular data has been set as described above is sent back to the PC 1.

As described above, contents of an arbitrary sector can be read out from each of the internal memories of the servo controllers #1 to #n by the code "sector-read".

When the "multi-purpose processing" is executed under conditions that instruction code indicating sector-write is set in the area 71 of the area 54 on the dual port memory 6, the number of a sector in which data is to be written is set in the area 133 of the area 54 and data to be written in is set in the area 134 of the area 54, the data frame with the contents of the area 54 (area 35) thereon is sent to the servo controllers #1 to #n.

Each of the servo controllers #1 to #n writes the contents of the area 134 in the area with the write-sector number stored in the area 133 of the area 35 in the data frame, and also sends back each data frame with the instruction code indicating "sector-write" set in the area 73 of the area 45, error status code indicating presence or absence of any error as well as a cause of the error set in the area 94, and with the number of the sector in which data has been written set in an area 135 respectively to the PC 1 as a "response".

As described above, data is possible to be written in an arbitrary sector on each of the internal memories (memory 15) in the servo controllers #1 to #n.

By adding to the PC 1 a block device driver for performing reading and writing data from and to an arbitrary sector by using the sector-read function as well as with the sector-write function, each of the servo controllers #1 to #n can be used as one of drives, and each of the internal memories thereof can be accessed from the PC 1.

Free reading and writing of data from and to a file may be restricted by setting file attributes stored in the areas 123 and 124 of the filing system header section 120 shown in FIG. 18 in a file dedicated to reading or a hidden file.

Figure 23:
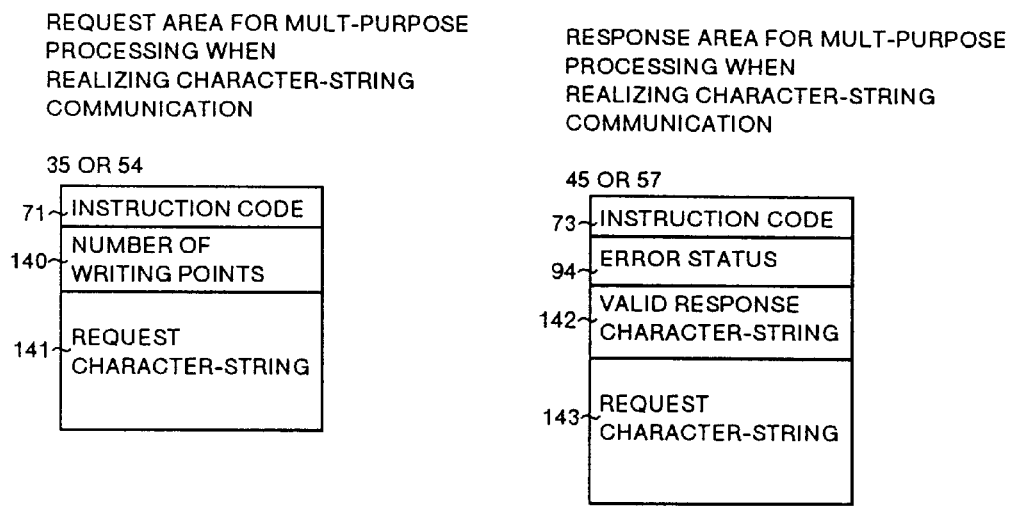
FIG. 23 is views showing structures of a request area as well as a response area for multi-purpose processing used when realizing character-string communications in Embodiment 1 of the present invention.
Figure 24:
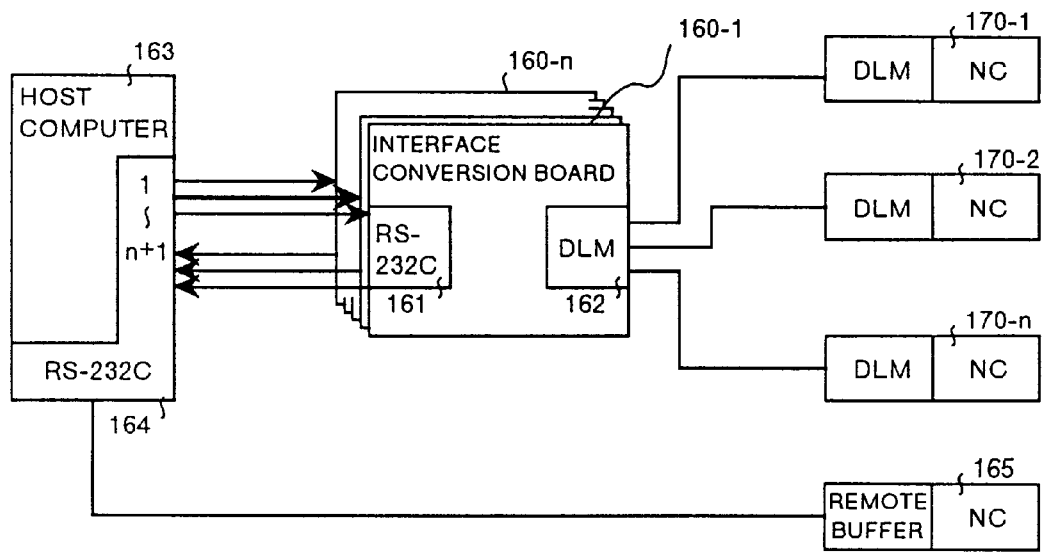
FIG. 24 is a block diagram showing the conventional type of servo control system.

FIG. 23 is views showing structures of request information as well as response information transacted between the servo controllers #1 to #n in "character-string communication" which is one of the "multi-purpose processing".

In FIG. 23, instruction code indicating "request for character-string communication" is set in the area 71 of the area 54 on the dual port memory 6, the number of characters constituting a character string in an area 140, a character string to be transmitted to the servo controllers #1 to #n in an area 141 respectively, and when the multi-purpose processing request flag in the area 62 on the dual port memory 6 is tuned ON, the contents (character string) of the area 141 is sent to the servo controllers #1 to #n.

Each of the servo controllers #1 to #n sends back, after the processing according to this character string is executed, to the PC 1 a data frame with a "response" in which the instruction code indicating character communication is set in the area 73, error status code indicating presence or absence of any error as well as a cause of the error in the area 94, the number of characters constituting the character string to be responded in an area 142 and the character string to be transmitted to the PC 1 in an area 143 respectively.

With this "character-string communication", like in the "direct operation", the PC 1 is possible to transmit a control program with a character string not based on a code system to the servo controllers #1 to #n, and also to fetch contents concerning alarm or the like with a character string from the servo controllers #1 to #n, and for this reason conversion of a control program between a code system and a character-string system is not required in the PC 1.

With this embodiment, as shown in FIG. 3, the "high-speed data read request", "high-speed data write request", "multi-purpose processing request", and flags such as "high-speed data read flag" can concurrently be sent from the PC 1 to the servo controllers #1 to #n, so that a request required for a particular processing of the requests for the high-speed data read processing, high-speed data write processing, any of the "multi-purpose processing", and various types of flag processing such as high-speed data read instruction flag processing can concurrently be notified from the PC 1 to the controllers.

Also, the "high-speed data read response", "stored data read response for one time", "multi-purpose processing response", "stored data read response flag" and "multi-purpose processing response flag" can concurrently be sent from the controllers to the PC 1, so that a response required for a particular processing among the response to high-speed data reading, response to stored data reading for one time, response to any of the "multi-purpose processing", and the response to the "stored data read response flag" can concurrently be notified from the PC 1 to the controllers.

Accordingly, it is clear that the invention is not limited to the embodiment described above, and, for example, by periodically sending a data frame with the "stored data read instruction flag" being on, turning ON the "stored data read instruction flag", when contents on the memory 15 of any servo controller has to be rewritten while a current position of a machine or the like is periodically monitored, of the data frame in that case, and by mounting information indicating a request for direct operation on the "multi-purpose processing request area", processing such as replacement of servo programs on the memory 15 of each of the servo controllers and rewriting of parameters can be executed without any interference with the monitoring operation.

Figure 22:
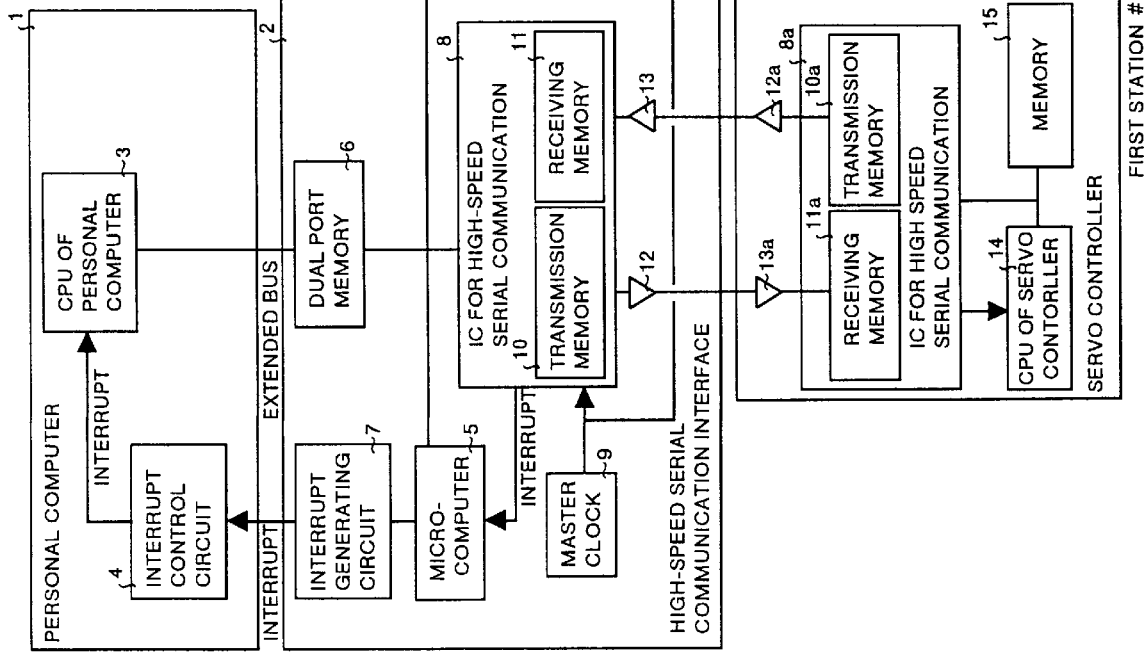
FIG. 22 is a block diagram showing a servo control system in Embodiment 2 of the present invention.

Although the PC 1 and the servo controllers #1 to #n are connected to the multi-drop system in Embodiment 1 and Embodiment 2, as shown in FIG. 22, a channel for connecting the servo controllers to the high-speed serial communication interface 2 is provided by the number of units required for the servo controllers, and the IC 8 for high-speed communication may be provided in each of the channels.

In Embodiment 1 and Embodiment 2, description has been made for the case where the invention is used for communications between the PC 1 and the servo controllers #1 to #n , but the invention may also be used for communications with control devices other than the servo controller.

With the present invention described above, first transfer information consisting of a specified number of information such as request information for each of the plurality of servo controllers is transferred in synchronism to a specified master clock from the computer to the servo controllers, second transfer information consisting of a specified number of information such as response information is transferred synchronously to the master clock from the servo controllers to the computer, the servo controllers concurrently execute a specified number of processing according to the first transfer information synchronously write to the master clock, and the motion control by the servo controllers is concurrently executed synchronously with to the master clock, so that servo controllers in a plurality of servo controllers can concurrently execute particular processing.

Instructional information corrected by using internal information in the servo controller such as feedback data sent from the servo controller as information in response information for the second transfer information is prepared, and this corrected instructional information is sent as information in request information for the first transfer information to the servo controllers, so that correction of instruction data to servo controllers according to internal information in the servo controllers can easily be performed.

Contents in any area on the memory of the computer is rewritten by any of a plurality of applications or the like, the information rewritten in the area is sent as information in request information for the first transfer information to the plurality of servo controllers, and contents in an area allocated in the memory of the servo controller corresponding to the area is rewritten with the information above, so that writing to internal memories of servo controllers according to an instruction from the computer can easily be performed.

Alarm information generated in any of the servo controllers is sent to the computer as information in response information for the second transfer information and is written on a memory of the computer, and appropriate instructional information corresponding to the alarm information is sent as information in request information for the second transfer information to the servo controller, so that, when an error occurs in any of the servo controllers, recovery processing can quickly be executed.

A program for control as information in request information for the first transfer information is transmitted from the computer to the servo controller, so that writing of a control program for the servo controller can easily be performed.

Instructional information for execution of a control program for each of the servo controllers as information in request information for the first transfer information is sent from the computer to the plurality of servo controllers for controlling synchronism between motors connected to the plurality of servo controllers respectively, so that control for synchronicity between motors connected to a plurality of servo controllers can easily be performed.

Internal information as a file in the servo controllers is accessed by sending write data or the like as information in request information for the first transfer information from the computer to the servo controllers and also sending read data as information in response information for the second transfer information from the servo controllers to the computer, so that reading and writing internal parameters in servo controllers and a control programs or the like can easily be performed from the computer.

Access to a memory in a servo controller is restricted according to setting of file attributes, so that access to a memory in a servo controller can be restricted.

Any of internal information in the servo controllers is set as particular information, and any of the plurality of servo controllers rewrites internal information in the servo controller corresponding to the internal information set in this particular information, this rewritten and updated internal information is sent as information in response information for the second transfer information to the computer, the computer sends the updated internal information as information in request information for the first transfer information to each of the other servo controllers respectively and corresponding internal information in each of the servo controllers is rewritten with this updated internal information, so that current status of processing in the servo controller can easily be notified to other servo controllers and internal data in other servo controllers can easily be changed from the servo controller.

This application is based on Japanese patent applications No. HEI 9-072443 and HEI 10-66428 filed in the Japanese Patent Office on Mar. 25, 1997 and Mar. 17, 1998, respectively, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A servo control method for executing serial communications between a computer and a plurality of servo controllers, wherein each of said servo controllers provides motion control for a plurality of motors, comprising:

transferring request information simultaneously to each of said plurality of servo controllers from said computer synchronously with a master clock; and transferring response information serially from each of said plurality of servo controllers to said computer synchronously with said master clock, wherein said servo controllers concurrently process said request information synchronously with said master clock and said motion control provided by each of said servo controllers is synchronous with said master clock.

2. The method as set forth in claim 1, further comprising:

collecting internally generated information from each of said plurality of servo controllers;

incorporating said internally generated information into said response information transferred to said computer; and incorporating said internally generated information into said request information transferred to said plurality of servo controllers.

3. The method as set forth in claim 1, wherein storage areas within said computer are allocated to correspond to storage areas on each of said plurality of servo controllers, each of said storage areas on each servo controller storing internally generated information, further comprising:

transferring at predetermined intervals said internally generated information from said storage area on each of said plurality of servo controllers to said allocated storage area on said computer within said response information;

modifying said internally generated information stored in said allocated storage area on said computer, and storing the modified information in said allocated storage; and transferring said modified information in said request information.

4. The method as set forth in claim 3, further comprising:

collecting alarm information from each of said plurality of servo controllers;

extracting said alarm information from said response information;

storing said extracted alarm information on said computer; and adding predetermined instructional information corresponding to said alarm information into said request information.

5. The method as set forth in claim 1, further comprising transferring a control program incorporated within said information request to said plurality of servo controllers.

6. The method as set forth in claim 1, wherein the step of transferring request information further comprises sending instructional information for execution of a control program to each of said servo controllers in order to maintain synchronicity between said motors connected to said plurality of servo controllers.

7. The method as set forth in claim 1, further comprising the storing of request information transferred from said computer as a file on at least one of said plurality of servo controllers.

8. The method as set forth in claim 7, further comprising restricting access to said file on said at least one of said plurality of servo controllers according to file attributes.

9. The method as set forth in claim 1, further comprising the storing of response information to be transferred to said computer as a file on at least one of said plurality of servo controllers.

10. The method as set forth in claim 9, further comprising restricting access to said file on said at least one of said plurality of servo controllers according to file attributes.

11. The method as set forth in claim 1, wherein allocation of storage areas within said computer corresponds to storage areas on each of said plurality of servo controllers, each of said storage areas on each servo controller storing internally generated information, and said internally generated information is transmitted to said computer at predetermined intervals in said response information, further comprising:

presetting said internally generated information in at least one of said plurality of servo controllers to a predetermined setting;

modifying said internally generated information in at least one of said plurality of servo controllers according to said predetermined setting, and storing the result;

transferring said result within said response information to said computer;

copying said result into said request information and transferring said request information to said plurality of servo controllers.

12. A servo control system, comprising:

a plurality of motors;

a plurality of servo controllers to provide motion control for said plurality of motors;

a master clock;

a computer for transferring request information simultaneously to said plurality of servo controllers synchronously with said master clock, and for transferring response information serially from said plurality of servo controllers synchronously with said master clock.

13. The servo control system as set forth in claim 12, wherein said plurality of servo controllers concurrently process said request information synchronously with said master clock.

14. The servo control system as set forth in claim 12, wherein said motion control provided by said plurality of servo controllers is executed synchronously with said master clock.

15. The servo control system as set forth in claim 12, wherein said plurality of servo controllers execute control programs transferred by said computer in said request information.

16. The servo control system as set forth in claim 12, wherein each of said plurality of servo controllers further comprises a memory for storing internally generated information.

17. The servo control system as set forth in claim 16, wherein said computer further comprises at least one memory allocated to said plurality of servo controllers for storing said internally generated information.

* * * * *